US 6,807,489 B2

(12) United States Patent  (10) Patent No.: US 6,807,489 B2
Naville et al.  (45) Date of Patent: Oct. 19, 2004

(54) METHOD FOR ABSOLUTE PRESERVED AMPLITUDE PROCESSING OF SEISMIC WELL DATA

(75) Inventors: Charles Naville, Grigny (FR); Sylvain Serbutoviez, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 21 days.

(21) Appl. No.: 10/285,630

(22) Filed: Nov. 1, 2002

(65) Prior Publication Data

US 2003/0086335 A1 May 8, 2003

(30) Foreign Application Priority Data

Nov. 7, 2001 (FR) .......................................... 01 14404

(51) Int. Cl.⁷ ................................................. G01V 1/28
(52) U.S. Cl. ..................................................... 702/17
(58) Field of Search ............................ 702/11, 14, 16, 702/17; 367/57, 73

(56) References Cited

U.S. PATENT DOCUMENTS 6,292,754 B1 * 9/2001 Thomsen ..................... 702/14
6,430,508 B1 * 8/2002 Sudhakar et al. ............. 702/17

FOREIGN PATENT DOCUMENTS

GB          1 569 581     6/1980 ............. G01V/1/36
WO          01/29581     10/2000 ............. G01V/1/40

OTHER PUBLICATIONS

J.L. Mari, et al., "Le Profil Sismique Vertical Traitment Et Applications Particulieres a La Connaissance Du Gisement", Revue de L'Institut Francais du Petrole, Editions Technip, Paris, France, vol. 44, No. 3, May 1, 2989, pp. 291–315.
J. Pujol, et al., "Seismic Wave Attenuation in Volcanic Rocks From VSP Experiments", Geophysics, Sep. 1991, USA, vol. 56, No. 9, pp. 1441–1455.
T.W. Spencer, "Seismic Q—Stratigraphy or Dissipation", Geophysics, Jan. 1982, USA, vol. 47, No. 1, pp. 16–24.
Preliminary Search Report w/English language translation.

* cited by examiner

Primary Examiner—Donald McElheny, Jr.
(74) Attorney, Agent, or Firm—Antonelli, Terry, Stout & Kraus, LLP

(57) ABSTRACT

A method for absolute preserved amplitude processing of data obtained by seismic prospecting known as VSP. The method comprises reception, by seismic receivers (R) arranged in a well and coupled with the surrounding formations, of seismic waves generated by a source (S) and reaching directly the receivers (direct or downgoing waves DW) or after reflections on discontinuities (D) (upgoing waves UW). The method has an application of precise measurement of the amplitudes of reflected and diffracted seismic events on monocomponent or tricomponent VSP data, in addition to conventional seismic wave propagation time and velocity measurements.

46 Claims, 15 Drawing Sheets

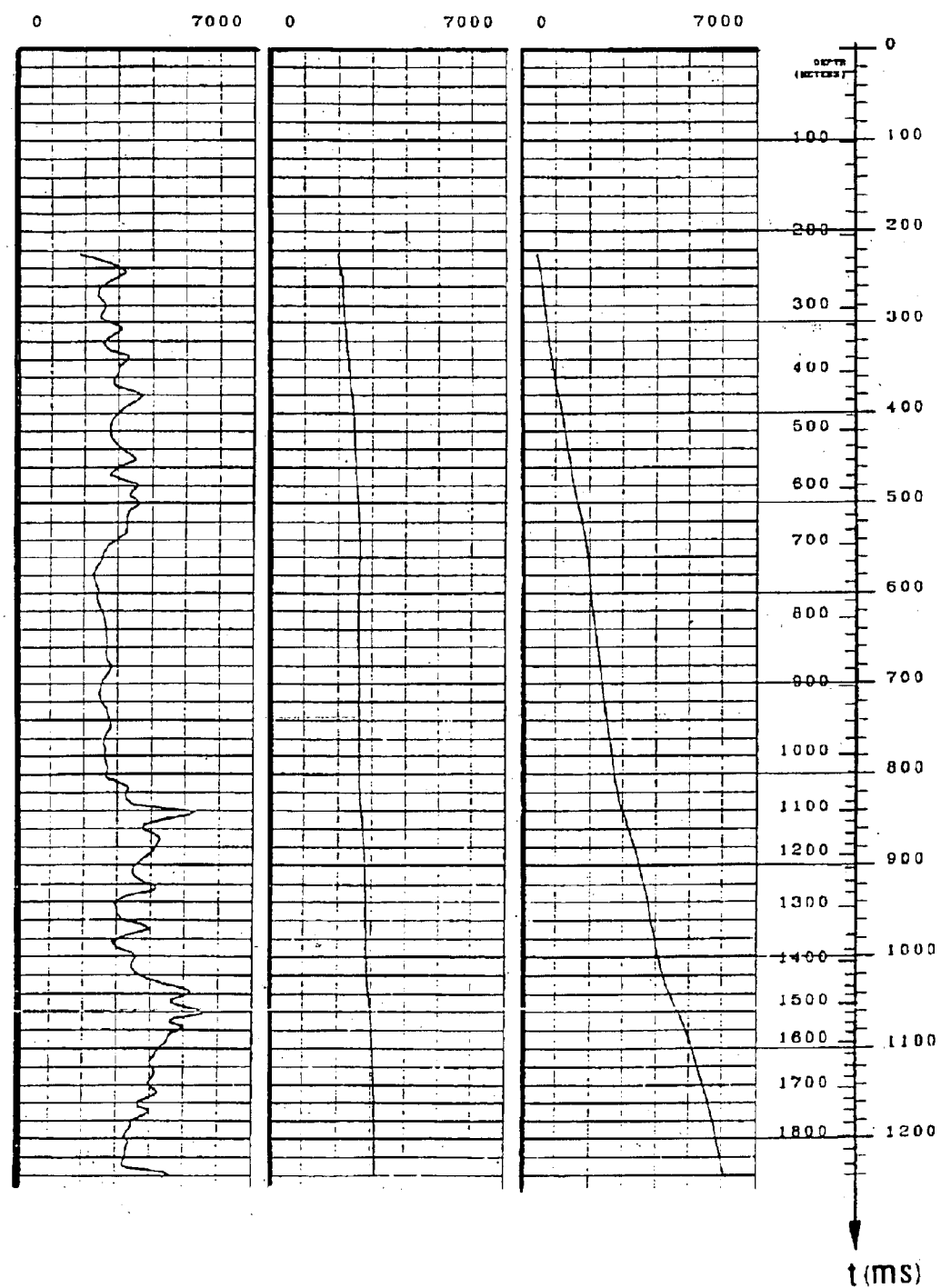

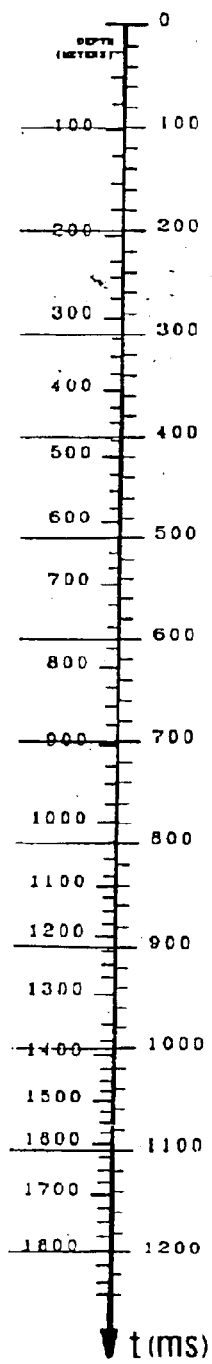
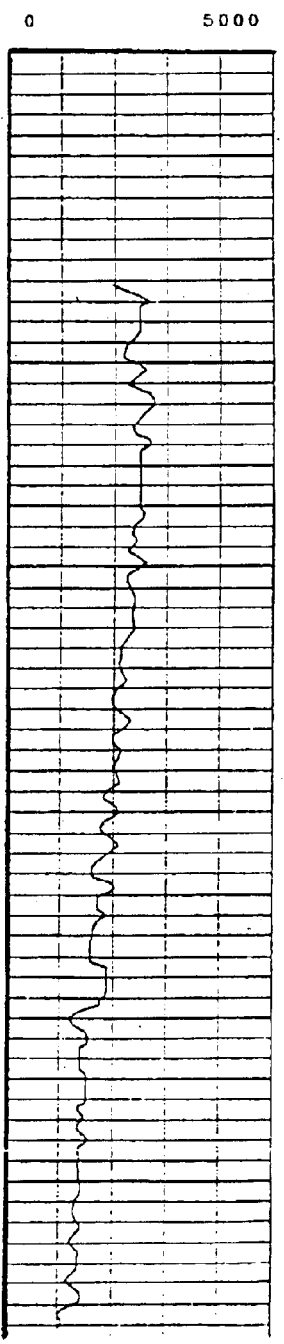
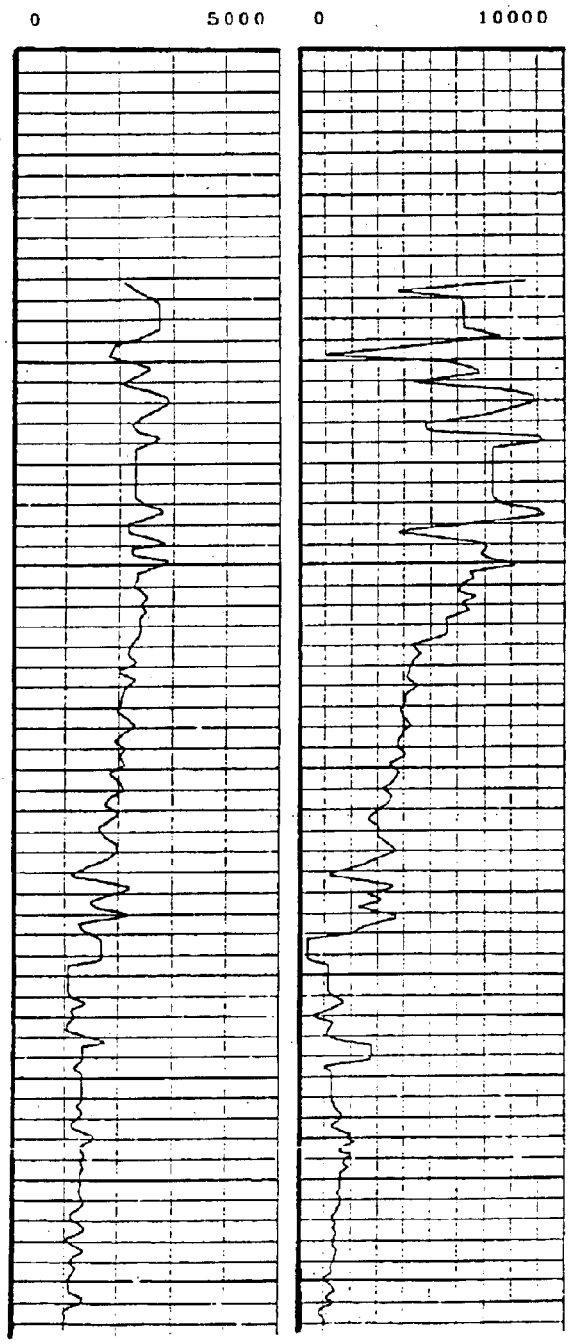
FIG.5A (10 35 HZ)    FIG.5B (35 70 HZ)    FIG.5C (70 100HZ)

t

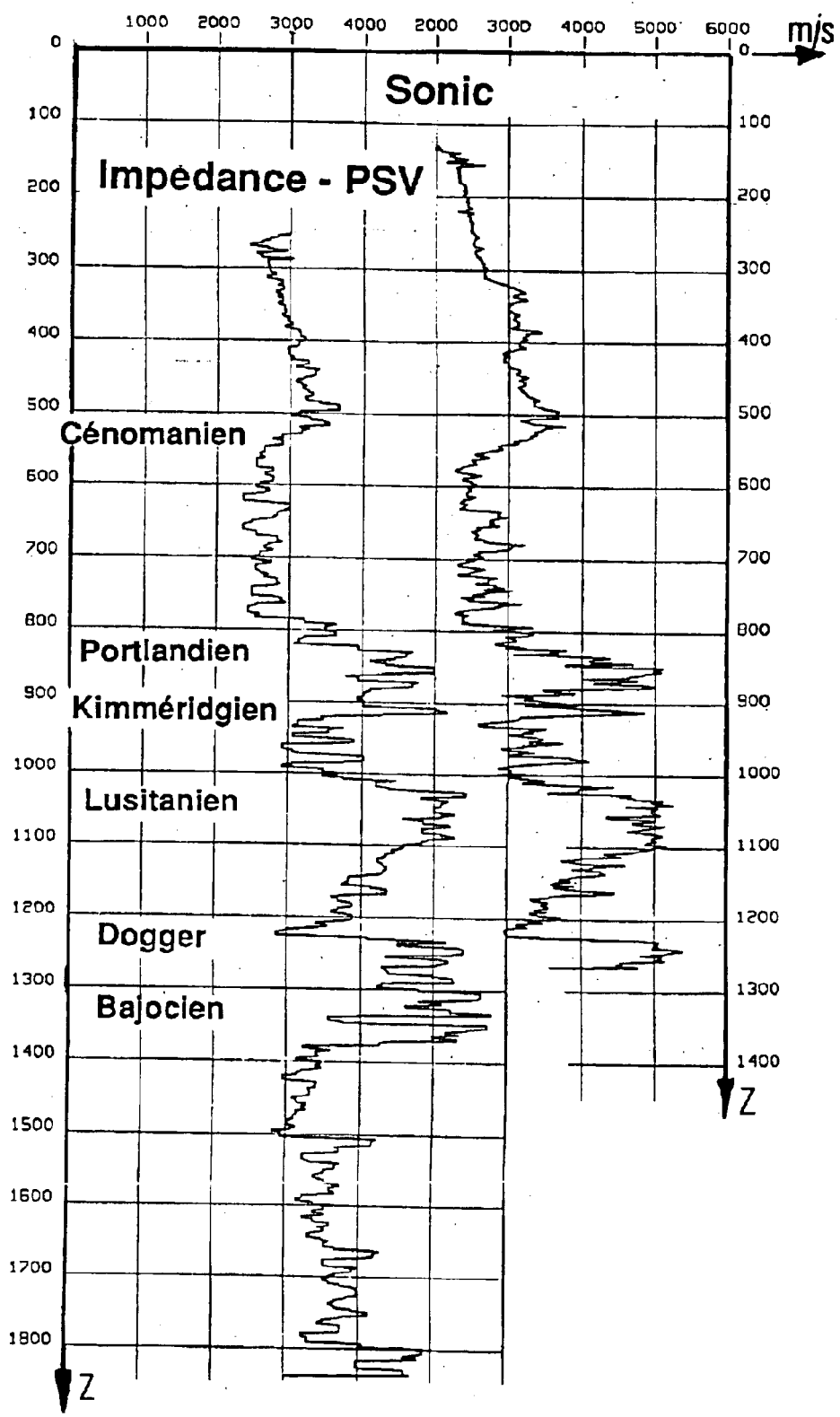

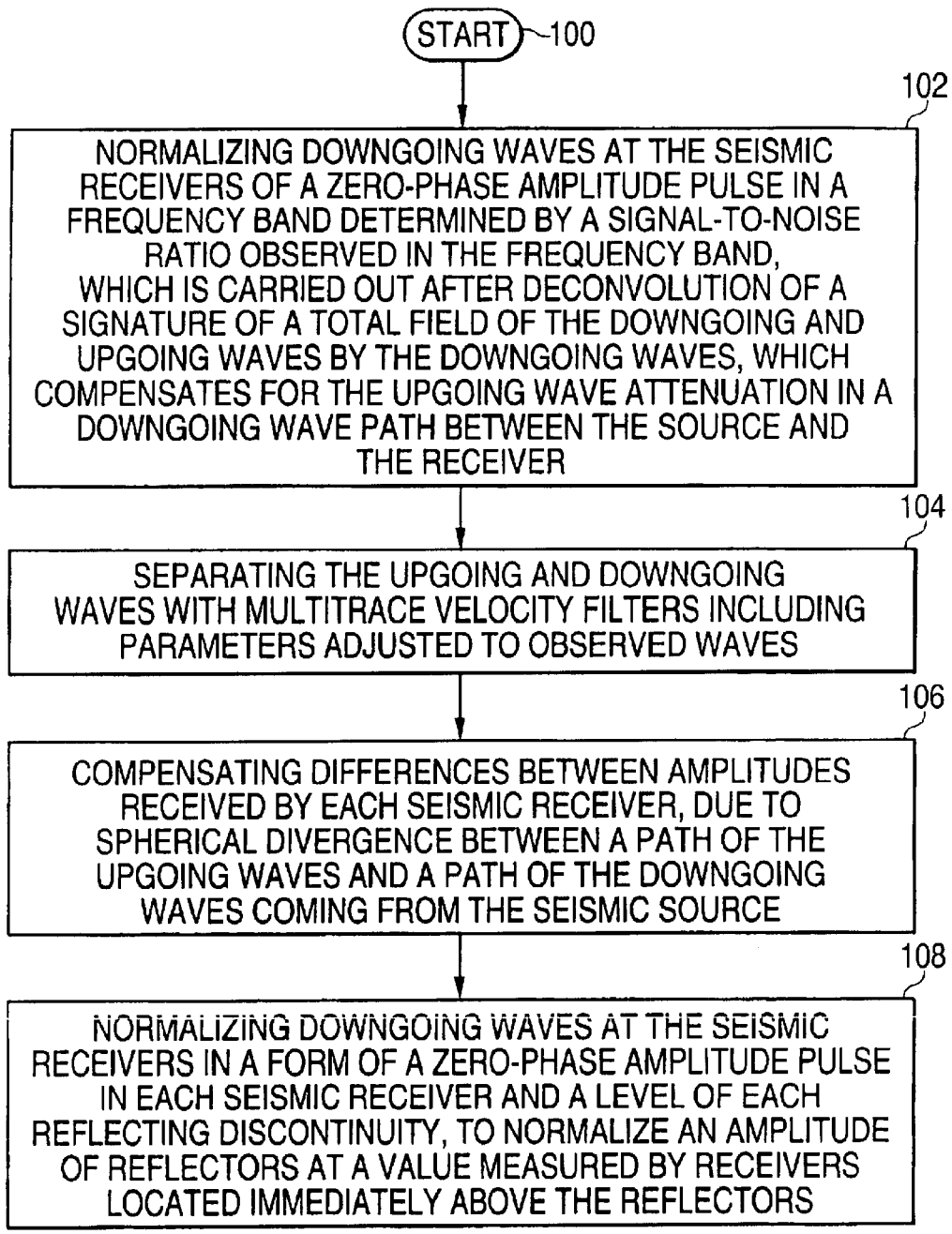

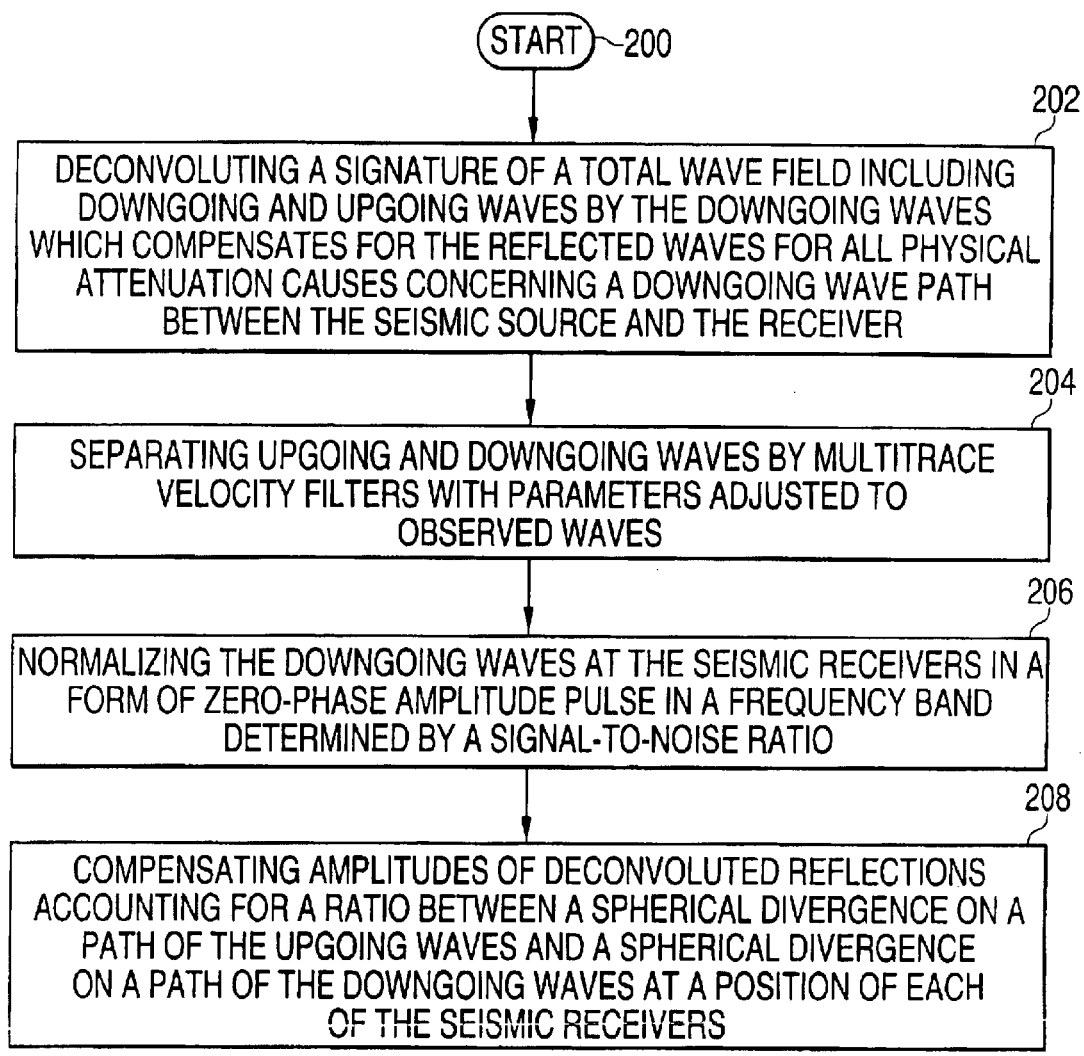

METHOD FOR ABSOLUTE PRESERVED AMPLITUDE PROCESSING OF SEISMIC WELL DATA

BACKGROUND OF THE INVENTION

1. Field of the Invention

The invention relates to a method for absolute preserved amplitude processing of data obtained by means of the seismic prospecting technique known as VSP, wherein seismic waves received by one or more multi-axis pickups coupled with the formations surrounding a well, coming from a seismic source arranged at the surface, either under direct arrival conditions, or after reflection on discontinuities of the underlying formation, are recorded.

2. Description of the Invention

The VSP technique is conventionally used to measure propagation times and velocities, and to obtain a zero-phase reference of the series of reflections on the reflectors encountered by the well (the stacking domain located immediately below the VSP measuring points is commonly referred to by specialists as corridor stack or VSP log, a designation that is used in the description hereunder). However, this series is produced by means of processing tools which modify the amplitude of the reflected signals: multiplication by a constant gain, rough spherical divergence compensation, dynamic time equalization and spectral equalization, etc. In fact, conventional methods allow recovery of the amplitude contrasts of the reflections in relation to one another according to the processing procedure used, but in practice they fall to recover the absolute amplitude ratio of the reflected waves in relation to the direct waves reaching the receivers. As a consequence, on the one hand, diffractions of very high amplitude may be mistaken for reflections, which leads the interpreter to be mistaken in the assessment of the structure in the vicinity of the well and, on the other hand, the real amplitude of the reflections cannot be exploited or interpreted.

The prior art in the field of seismic attenuation measurement, in particular by means of the Vertical Seismic Profiling method, and its consideration during processing, is illustrated by many publications, and notably by the following publications:

Gardner, G. H. F., L. W. Gardner, and A. R. Gregory: Formation Velocity and Density;

The Diagnostic Basics for Stratigraphic Traps. Geophysics Vol. 39, No. 6, 1974, pp. 770–780;

Hauge, P. S.: Measurements of Attenuation from Vertical Seismic Profiles, Geophysics, Vol. 46, 1981, pp. 1548–1558;

Kan, T. K., et al.: Attenuation Measurement from Vertical Seismic Profiling, SEG Expanded Abstracts, LA meeting, October 1981, pp. 338–350;

Lee, M. W., et al.: Computer Processing of Vertical Seismic Profile Data, Geophysics, Vol. 48, No. 3, March 1983, pp. 282–287;

Newman Paul: Divergence Effects in a Layered Earth, Geophysics, Vol. 38, No. 3, June 1973, pp. 481–488;

Newman, P. J., et al.: In Situ Investigation of Seismic Body Wave Attenuation in Heterogeneous Media, Geophysical Prospecting 30, pp. 377–400, 1982;

Payne, M. A.: Looking Ahead with Vertical Seismic Profiles, Geophysics Vol. 59, No. 8, August 1994, pp. 1182–1191;

Pujol et al.: Interpretation of a Vertical Seismic Profile Conducted in the Columbia Plateau Basalts, Geophysics, Vol. 54, No. 10 (October 1989), pp. 1258–1266;

Pujol & Smithson: Seismic Wave Attenuation in Volcanic Rocks from VSP Experiments, Geophysics, Vol. 56, No. 9 (September 1991), pp. 1441–1445;

Spencer T. W. et al.: Seismic Q—Stratigraphy or Dissipation, Geophysics, Vol. 47, No. 1 (January 1982), pp. 16–24;

Spencer, T. W., 1985: Measurements and Interpretation of Seismic Attenuation in Fitch, A. A., Ed. Developments in Geophysical Exploration Methods, 6, Elsevier Science Publ. Co. Inc., pp. 71–109;

Stainsby S. D. et al.: Q Estimation from Vertical Seismic Profile Data and Anomalous Variations in the Central North Sea, Geophysics, Vol. 50, No. 4 (April 1985), pp. 615–626;

Rainer Tonn: The Determination of the Seismic Quality Factor Q from VSP Data. A Comparison of Different Computational Methods, Geophysical Prospecting, April 1990;

Ross, W. S., et al.: Vertical Seismic Profile Reflectivity. Ups Over Downs, Geophysics, Vol. 52, No. 8 (August 1987), pp. 1149–1154;

Rutledge, J. T., and Winkler, H., Attenuation Measurements in Basalts Using Vertical Seismic Profile Data from the Eastern Norwegian Sea: SEG, Expanded Abstracts, pp. 711–713, New Orleans, 1987;

Sokora, W. L., 1996, Predicting Formation Target Depth Ahead of the Bit with High Accuracy: A case Study from the Arun Field for a Deviated Well: Proceedings of the indonesia Petroleum Association, IPA96-2.5-028;

Wu R. and K. Aki, Scattering Characteristics of Elastic Waves by an Elastic Heterogeneity, Geophysics, Vol. 50, No. 4, April 1985, pp. 582–595;

Yuehua Zeng, Feng Su and Keiiti Aki, Scattering Wave Energy Propagation in Random Isotropic Scattering Medium, JGR, Vol. 96, No. B1, pp. 607–619, January 1991.

The aforementioned publications describe methods of measuring the attenuation of seismic waves in transmission for vertical seismic profile data (VSP). These measurements are sometimes performed too roughly but, unfortunately, none of these publications provides a solution concerning the way to use these measurements so as to more exactly recover by processing the amplitude of the reflected events observed on the VSPs, for any distance between the position of the well pickups and of the reflectors, including reflectors located below the well bottom, which is the major object of the method according to the invention.

The spherical divergence, which is the most important factor in the amplitude decrease of a spherical seismic wave, is often compensated by an approximate law of Z=Vt type (Newman and Worthington, 1982), or by an exponential law of $\exp(\pi f \, \tau/Q)$ type for the events reflected below the well bottom (Payne, 1994), or by a rough time power law $T^n$, superscript n being adjusted by guesswork typically between 1 and 2, as it is generally done by well survey service companies. In a stratified medium close to a one-dimensional model, the spherical divergence can be taken into account more accurately by a $t.V^2$ law (Newman, 1973), but this relation is rarely used (Pujol, 1991). The local impedance is never taken into account in the aforementioned publications, and the amplitude of the reflections is never examined. The 1D hypothesis is always made, but never verified in the literature. Many authors use a method of studying the evolution of the amplitude spectrum ratio of the direct arrival of the VSP taken at different depths (Kan, 1981) to determine the attenuation and the quality factor Q which characterizes it; others (for example Stainby, 1985) use the widening of the direct arrival pulse width: these methods may therefore be very sensitive to the reflected or diffracted waves that interfere with the direct arrival. Some authors, such as Rainer Tonn (1990), have successfully compared various measuring methods.

All the methods used assume the stationarity of the signal of the VSP downgoing wave, and this hypothesis is unfortunately not always verified in real cases. In effect, the fact that a spherical wave is propagated in a 1D stratified medium implies that part of the energy transmitted in P wave is converted to an S wave, even for low propagation incidences, and therefore the attenuation measured on the direct wave is often overestimated.

However, the order of magnitude of the measured attenuations is 1 to 13 dB per 1000 m (Pujol, 1989) for heterogeneous sedimentary or volcanic rocks.

The velocity variation function of the frequency is often insignificant between 10 and 100 Hz, even when considering a dispersive model of intrinsic attenuation, and the inner multiples can generate by themselves a not insignificant fraction of the total attenuation, for example 30% or 2 dB for 1000 m (Kan, 1981).

Any velocity heterogeneity close to the well can produce interferences which in most cases attenuate direct arrivals, but sometimes amplify them. This also depends on the way the amplitude is measured on the direct arrival (on the peak, the trough or the spectrum, therefore with a windowing and an amplitude variation linked with the apodization of the signal selected, etc.). Besides, propagation in a medium with a random velocity, therefore very heterogeneous in view of the velocity, is difficult to study, as shown by the complexity of publications by authors such as Wu (Wu et al., 1985) and Yuehua Zeng (Zeng, 1991).

In general, zero-offset profiles recorded in a stratified sedimentary medium show a very stable direct arrival signal, mainly interfered by the reflections on the sedimentary layer boundaries, and they are well-suited for fine study of the attenuation of the seismic signal.

Causes of the Seismic Amplitude Variation

The first two causes reminded hereafter relate to the constancy of the plane wave energy upon emission and reception, the two others concerning the effects due to the propagation of the seismic signal transmitted:

a) The amplitude variations of the source, which require recording of a reference signal. In practice, very repetitive sources as regards the form of the signal emitted are used for VSP acquisition, and a surface pickup arranged at a short distance from the source is sufficient to check the repetitiveness and to compensate variations in the emission energy and in the vertical stacking order.

b) The local impedance variations, which lead to variations in the amplitude of the plane wave transmitted at constant energy. In order to draw amplitude attenuation curves, the square root of the energy has to be represented, which amounts to saying that the amplitude observed at different points of a medium of variable acoustic impedance is brought back to the amplitude of a wave of equivalent energy in a single impedance medium. The interval velocity is given by the VSP and the density can be estimated by first approximation by Gardner's law (Gardner, 1974) from the interval velocity.

c) The spherical divergence, which shows the expansion of the wavefront, depends for its compensation on the difference of the radii of curvature between two points located on the same seismic raypath. In particular, in the case of the VSP, compensation of the spherical divergence effect between the direct arrival and the reflections that follow is desired. This compensation must be very precise because the spherical divergence is the main attenuation factor, of an order of magnitude is greater than the cumulated other causes. This compensation depends on the source-geophone distance and on the characteristics of the depth interval between the geophone and the reflector below. It has the effect of bringing the amplitude of the wave emitted by a point source back to the amplitude of a plane wave for a direction of propagation identical to the direction observed at the measuring point, while disregarding the wave mode conversions (converted P-S or S-P).

d) The attenuation of a plane wave in transmission, all causes taken into account, in a 1-D medium, which includes, in a non limitative way: primary reflections, short-period inner multiple reflections, intrinsic transmission attenuation and diffusion/diffraction, etc., as far as these effects remain statistically 1-D as regards the roughness of the interfaces and the heterogeneity distribution.

This attenuation is calculated from the amplitudes of the VSP direct arrivals. It is identical, for a 1D medium, in two opposite propagation directions because of the reciprocity of the paths for a wave of a given type (of pure P or pure S type); under such conditions, for a vertical two-way path of a plane wave in a medium with homogeneous horizontal layers, and with a zero offset, the attenuation for a reflection is equal to the square of the attenuation measured on the first arrival for the corresponding one-way path. It is thus compensated in two-way propagation (loop travel) for the interval between the direct arrival and the reflections that follow, by multiplying the amplitudes of the reflections by the square of the inverse of the one-way path attenuation measured on the same depth interval. This correction does not depend on the source-geophone distance. The spherical divergence compensation and plane wave attenuation laws thus do not have the same form, which explains why it has always been difficult to compensate these two effects in combination by means of empirical laws. Furthermore, the use of the plane wave compensation outlined above allows determination of the accuracy limits of the attenuation calculations carried out on the direct arrival, and an empirical approach based on sound and reasonable geological and geophysical hypotheses allows, when the hypothesis of propagation in a one-dimensional medium is valid, to refine determination of the attenuation if the object of the operation.

The plane wave attenuation can depend on the frequency in any way and is determined by frequency bands.

SUMMARY OF THE INVENTION

The method according to the invention allows correct recovery of the absolute amplitudes of the events reflected through finer processing in order to obtain as the final product of VSP, on the one hand, in absolute amplitude, a quantified series of reflection coefficients encountered at the location of the well, and on the other hand, in preserved amplitude, i.e. with the highest accuracy possible on the amplitudes, a reflected wavefield that is referred to as deep when the distance between the downhole pickup and the impedance contrast generating a reflection is great, in particular below the well bottom, in order to make for example a more accurate prediction of the characteristics of the formations while drilling operations are in progress.

The processing method according to the invention allows recovery of the absolute amplitude ratios between, on the one hand, the seismic signals corresponding to upgoing waves emitted by a seismic source coupled with a geologic formation, then reflected on subsoil discontinuities, these signals being received by various seismic receivers coupled with the wall of a well through the formation and at a distance from one another, and on the other hand the seismic signals corresponding to downgoing waves (or direct arrivals) received by the same seismic receivers and coming directly from the seismic source.

In order to achieve this, the method determines quantitatively all the main causes of the attenuation of the seismic waves, in using them to compensate in the most suitable way the amplitude of the reflections measured by VSP according to the distance from the reflection point to the receivers in the well, and also in recovering the exact amplitude, referred to as absolute amplitude, of the coefficients of the reflections observed, in percentage, because this quantitative information has a specific incidence both for geologists regarding interpretation of the seismic prospecting results and for geophysicists carrying out surface seismic prospecting regarding the adjustment of certain acquisition parameters or the processing of surface seismic survey data. The method comprises the following steps:

a) First normalizing the direct arrivals at seismic receivers (R) in form of a zero-phase unit amplitude pulse in a limited frequency band determined by the signal-to-noise ratio observed in this band, which is carried out after deconvolution of the signature of the total field of the downgoing and upgoing waves by the downgoing waves, which allows compensation of the reflected arrivals for all the physical attenuation causes concerning the direct arrival path between the source and the receiver. This compensation includes, for example, all the possible amplitude and phase variations of the direct arrival and of the downgoing wavetrain according to the depth of the receiver, the spherical divergence of the direct arrival, and the effect due to the impedance of the geologic formation locally at right angles to the receiver, b) then separating the upgoing and downgoing waves by means of multitrace velocity filters whose parameters are adjusted to the waves observed, c) then compensating the differences between the amplitudes received by each seismic receiver, due to the spherical divergence between the paths of the upgoing waves and the paths of the downgoing waves coming directly from the seismic source. This compensation is preferably calculated univocally by the depth of the receiver, the depth of the underlying reflector and the velocity characteristics of the propagation medium.

According to an embodiment, the method comprises compensating the transmission attenuation (selectively by frequency band preferably) on the two-way path between the level of each seismic receiver and the level of each reflecting discontinuity, calculated from the amplitudes measured on the direct arrivals at the seismic receivers.

According to an embodiment, the method comprises compensating the transmission attenuation on the two-way path between the level of each seismic receiver and the level of each reflecting discontinuity so as to normalize the amplitude of key reflectors at the value measured on the receivers placed immediately above the key reflectors.

A key reflector normalization law allowing precise determination of the attenuation of the formations intersected in the depth zone is for example selected. The plane wave attenuation is thus measured in a single wave mode, either pressure wave (P waves) or shear wave (S waves), that is not affected by mode conversions and transmission losses.

According to an embodiment, the seismic energy lost by wave mode conversion during transmission through the reflecting seismic interfaces in the frequency band is determined by the difference between the two-way plane wave attenuation law used to normalize the amplitude of key reflectors in the depth zone (preferably in a structural environment comparable to a 1D one-dimensional model) and the square of the one-way plane wave attenuation law measured on the direct arrivals at the seismic receivers and in the same frequency band.

The method can comprise an impedance inversion of the stacked seismic trace (VSP log) or of any preserved-amplitude well survey image: preserved-amplitude reflected wave field, imaged by an offset VSP profile, by a deflected well VSP profile or by a walkaway type seismic well profile with a mobile source. This operation allows determination of the seismic impedance and velocity of the formations below the depth reached, for the time being, by the drilling operation and consequently to improve the efficiency of the decisions made for the continuation of the drilling operation. This specific application of the vertical or deflected well VSP, commonly referred to as "prediction VSP beyond the bit" or "beyond the hole bottom", is carried out either from a VSP called "intermediate" profile, recorded prior to laying an intermediate tubing, or from a VSP recorded during drilling and processed several times during hole deepening.

In cases where each seismic receiver comprises three pickups oriented along three different axes, the method comprises for example isotropic processing of the three oriented components and taking into account the total resultant of the downgoing direct wavetrains for the deconvolution and normalization operations.

The method can also comprise preprocessing so as to compensate the amplitude variations of the waves emitted by the source, due to repetitiveness defaults, and a signature deconvolution of the seismic source.

The method according to the invention does not involve analysis of the amplitude spectra of the direct arrivals, or any amplitude decrease law as a function of the frequency, but only the initial VSP measurements, by measuring time attributes and amplitudes of the direct arrivals.

The method can be applied for recovery of the seismic events reflected in converted P-S or S-P type mode, or in pure S-S mode.

BRIEF DESCRIPTION OF THE DRAWINGS

Other features and advantages of the method according to the invention will be clear from reading the description hereafter of embodiments given by way of non limitative example, with reference to the accompanying drawings wherein:

FIGS. 4a, 4b and 4c show, as a function of the vertical two-way time scale (Tv), from left to right, the interval velocity (Vint.), the rms velocity (Vrms) and the spherical divergence factor ($V^2$rms, Tv), FIGS. 5a, 5b and 5c show, in three successive frequency bands, the plane wave amplitude attenuation laws, as a function of the two-way time, normalized at the unit for the measuring levels at the well bottom, FIGS. 10a and 10b show the impedance inversion of a VSP log (FIG. 10a) and a log obtained with a non calibrated sonic type tool (FIG. 10b), both in a two-way time scale.

FIG. 11 is a flowchart of a seismic processing method in accordance with the invention, and FIG. 12 is a flowchart of another seismic processing method in accordance with the invention.

DETAILED DESCRIPTION OF THE PREFERRED EMBODIMENTS

Consideration of the context of VSP type seismic prospecting operations (see FIG. 1), seismic traces acquired by one or more seismic receivers R coupled with the wall of a well drilled through a geologic formation, in response to the triggering of a seismic source S (a vibrator for example) is given. The waves received are direct or downgoing arrivals DW and waves UW are reflected on discontinuities D of the formation (or upgoing waves).

The method according to the invention measures all the main causes of the attenuation of the seismic waves, but also in using them to compensate in a more suitable way the amplitude of the reflections measured by VSP according to the distance from the reflection point to the receiver in the well.

The method allows recovery of the exact amplitude, referred to as absolute amplitude, of the reflection coefficients observed, because this information has a specific incidence both for geologists regarding interpretation of a seismic survey and for geophysicists carrying out surface seismic surveys regarding the adjustment of certain acquisition parameters or the processing of the surface seismic survey data. An important application is predicting, below the temporary total depth of a well, various important parameters: distance of a key reflector to be reached during drilling, formation velocity, in particular when the presence of overpressured layers potentially dangerous to drilling operations, as described in the aforementioned references: Sokora 1996, Ross 1987, Payne 1994, is suspected.

Description of the preserved-amplitude processing of VSP data

Compensation of the amplitude variations of the source

Figure 1:
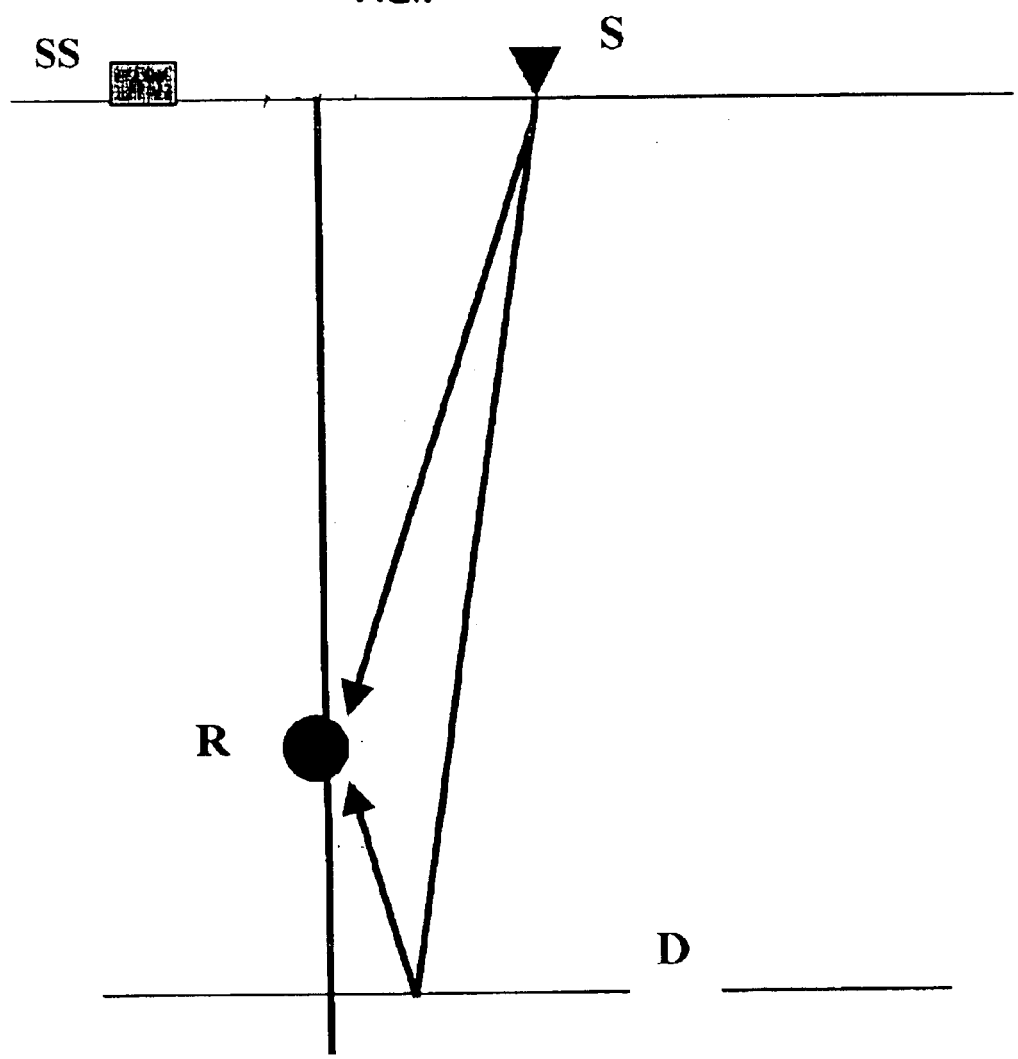
FIG. 1 diagrammatically shows an acquisition configuration suited to a zero-offset VSP type seismic prospecting method: the source has no lateral offset, and in a medium referred to as 1-D medium, comparable to one dimension, where the major variations depend only on the depth.

One of the rules commonly used for acquisition of VSP type seismic data is placing a surface pickup (SS) close to the source (S), as shown in FIG. 1, so as to check that the signal emitted by the source is really repetitive; if the source signal is repetitive and if a variation of the direct arrival signal recorded by the receiver occurs progressively as a function of the depth, a notable anomaly of the structure is to be expected in the vicinity of the well, and the propagation medium can no longer be compared to a 1D or one-dimensional medium.

Processing starts with the possible normalization of the emission amplitude of a shot if it is not constant. Although this normalization is often unnecessary when using a vibrator (vibroseis type emission), a constant-gain playback of a surface trace however constitutes a minimum control in any case. When vertical stacking is performed, the stacking order has to be compensated. To normalize, the amplitudes are picked on the signal of constant shape of the reference pickup, then all the traces of the corresponding shot are divided by the picked amplitude.

For offshore VSP prospecting operations using an air gun as the seismic source, a signature deconvolution first has to be carried out, followed by vertical stacking; the signature is recorded shot by shot by a hydrophone usually located approximately 3 to 8 m below the source, the signal provided by the accelerometer associated with the gun being in no way representative of the signal emitted. The signature deconvolution compensates both shape variations and arrival time variations (phase and amplitude).

Compensation of the impedance variations at the level of the pickup

This compensation is performed only when establishing the plane wave attenuation curve, all causes being taken into account, as described hereafter, from uncorrected amplitude measurements.

As mentioned above, compensation takes place naturally for reflections when the waves reflected by the direct wave taken as the signature are deconvoluted. It is however desirable to ensure, on the one hand, that deconvolution of the direct wave by the same operator applied to the reflections allows recovery of a zero-phase pulse of identical amplitude for all the traces, and on the other hand that the upgoing and downgoing wave separation programs do not alter the amplitudes with the depth; careful attention should be paid to edge effects in particular.

Spherical divergence recovery for VSP operations in a 1D medium

With low offsets, low deviations, low-angle dips, it is well-known to apply the multiplying factor $V^2.t$ where V=Vrms (room mean square velocity) and t the uncorrected direct arrival time (vertical time for the zero-offset VSP). Velocity Vrms is calculated from the interval velocities $v_i$ measured at depth point is $$v_i = \frac{t_i - t_{i-1}}{z_i - z_{i-1}}$$

by:

$$tV_{rms}^2(t) = \sum_0^t v_i^2(t_i - t_{i-1}) \quad (1)$$

Consider a reflection at the uncorrected time t, on the trace whose direct arrival time is $t_0$ ($t>t_0$). The two-way time of this reflection is $T=t+t_0$. If $W(t_0)$ is the rms velocity of direct time $t_0$, $W(t)$ denotes the rms velocity of the reflection at the uncorrected time t. The spherical divergence correction to be applied to this reflection is given by the multiplying factor $s.d(t,t_0)=t.W^2(t)$ that can be readily calculated by means of additional law (1) at $v^2.t$:

$$t.W^2(t)=(t+t_0).W^2(t+t_0)-t_0.W^2(t_0)$$

or:

$$sd(t,t_0)=(t+t_0).V^2(t+t_0)-t_0.V^2(2t_0) \quad (2)$$

with $T_0=2 t_0$ (two-way time) and V=Vrms for two-way times.

Measurements of the direct arrival times at the seismic receivers allow ready determination the interval velocities (FIG. 4a), the root mean square velocity (Vrms, FIG. 4b) and the spherical divergence factor (t.$V^2$rms, FIG. 4c) represented versus two-way time.

It can be noted that, for a two-way traveltime T in a zero-incidence 1D medium, the rms velocity for the loop travel $V(T_0)$ is identical to the rms velocity $W(t_0)$ of the one-way traveltime $t_0$, law $V(T)$ being expressed as a function of the two-way time variable T, whereas $W(t)$ is the physical rms velocity function of any travel time.

Furthermore, it can be seen from Equation (2) that the spherical divergence factor to be applied at the time t of the trace in uncorrected time depends on the equivalent vertical two-way time $T=(t+t_0)$ and on $t_0$. It is thus more convenient to perform a translation in time of the reflected signal to the two-way time position: this transtation by $+t_0$ corresponds to a variabie change of function $s.d(t,t_0)$ but the value thereof remains unchanged: t becomes $t+t_0=T$; $t_0$ becomes $t_0+t_0=T_0$, in the left part of Equation (2) only: SD $(T,T_0)$=SD $(t+t_0, 2t_0)$=sd$(t, t_0)$.

The two-way time (T) spherical divergence (SD) thus takes the simple form as follows:

$$SD(T-T_0) = T \cdot V^2(T) - \frac{T_0}{2} \cdot V^2(T_0) \quad (3)$$

Thus, the divergence to be applied to two-way time T only depends on T and on the two-way time of the direct arrival T of the corresponding trace.

Moreover, since after deconvolution of the upgoing waves by the downgoing waves, the direct arrival deconvoluted by itself is already normalized at one unit pulse or spike, the divergence factor has to be normalized at the direct arrival time, i.e. the direct two-way time $T_0$ after flattening of the reflected waves, hence the expression of the normalized divergence (SDN) to be applied to the reflected signals:

$$SDN(T, T_0) = \frac{SD(T, T_0)}{SD(T_0, T_0)} = 2 \cdot \frac{T \cdot V^2(T)}{T_0 \cdot V^2(T_0)} - 1$$

Consequently, it is sufficient to calculate the trace $g(T)=T.V^2(T)=2t.v^2(t)$ from the discrete sequence of values $g(T^i_0)$, i being the depth point index of the VSP measurements and $T^i_0$ the corresponding two-way time, g(T) represents the radius of curvature of the wavefront.

T=two-way time, V=rms velocity law in two-way time,

T=one-way time, v=rms velocity law in one-way time.

Then, for each trace of index I, the gain variation to be applied to compensate the spherical divergence is calculated:

$$SDN(T, T^i_0) = 2 \cdot \frac{g(T)}{g(T^i_0)} - 1 \quad \text{for } T > T^i_0, \text{ and}$$

$$SDN(T, T^i_0) \text{ equal to } 1 \quad \text{for } T < T^i_0.$$

Below the well bottom, velocity Vrms for extrapolating function g(T) is estimated by means of data provided by seismic operations carried out at the surface and/or at interval velocities estimated or known otherwise.

Extension of the calculation of the spherical divergence compensation for deviated wells and the horizontal-offset source of the well receiver can be generalized by means of the following operations:

a) definition of a velocity law for normal-moveout corrections (also referred to as NMO velocity by specialists) for each depth point, b) divergence compensation on the direct and reflected waves by the suitable program existing in current surface survey data processing softwares used by geophysics contractors, and c) renormalization (constant gain) of the amplitude of the direct arrival, already normalized at the input after deconvolution, application of the same constant gain to the reflections.

Extension of the spherical divergence compensation calculation for converted reflected waves, for example P-S type waves with incident wave of P (Pressure) type and reflection in converted wave of S (shear) type, poses no particular problem. For example, for low offsets, the expression of the spherical divergence in PS mode becomes:

$$t.psW^2(t.ps)=tp.W^2(tp)+tsr.W^2(tsr)=(tp+ts).W^2(tp+ts)-ts0.W^2(ts0) \quad (4)$$

with tp: time of the incident P wave to the reflector tsr: time of the reflected S wave from the reflector to the well pickup tps=tp+tsr ts0: time of the direct S wave between the surface source and the well pickup tp+ts: time of a reflected P-S surface-reflector-surface travel We have by definition:

$$(tp+ts).W^2(tp+ts)=tp.W^2(tp)+ts.W^2(ts).$$

The two-way time (T) spherical divergence (Sdps) therefore takes the simple form as follows:

$$SDps(tps_0)=tp.W^2(tp)+ts.W^2(ts)-ts_0.W^2(ts_0) \quad (5).$$

In order to compensate the spherical divergence between the direct arrival P and the reflected arrival PS, the following simple law can be applied on reflected traces of the VSP, preferably put into two-way time tp+ts:

$$SDNps(tp + ts_0) = \frac{(tp \cdot W^2(tp) + ts \cdot W^2(ts)}{ts_0 \cdot W^2(ts_0)} - 1$$

Recovery of the plane wave attenuation, all causes taken into account, in a impedance-homogenized 1-D medium, deduced from the uncorrected amplitude measurements of the zero-offset VSP Let A(z) or A(t) be the uncorrected amplitude of the vertical component, axial to the well, after normalization of the constant-energy source. The uncorrected amplitude is measured automatically by standard processing in the same way as the time of the first arrival. The equivalent plane wave amplitude is defined by Ap:

$$A_p(t) = A(t) \cdot V^2 t \sqrt{p \cdot v} \qquad (6)$$

In fact, the spherical divergence compensated uncorrected amplitude $A'p = A \cdot V^2 \cdot t$ corresponds to the amplitude of the equivalent plane wave propagated in the same medium, therefore in a tube of invariable cylindrical section radius, insofar as there is no wave mode conversion. The energy density of this plane wave is expressed by the known relation: $E = p \cdot v(A'_p)^2$; to homogenize the impedance of the medium amounts to bringing it back to the medium of unit impedance in which the plane wave considered has the same energy $E = A^2_p$, thus defining Ap by expression (6) above.

Determination of Curve Ap(Z) or Ap(t)

The interval velocity v is deduced from the VSP, it often increases by as much as 100% with the depth ($\sqrt{2}$ equals 3 dB) between 200m and 2000 m.

Density p is not known, it can be assumed to be constant a priori, but it is more accurate to take an estimation by Gardner's aformentioned empirical law: $p = 0.23 \, v^{25}$, which is really representative apart from salt and gas zones, while meeting the following constraint: $2 < p < 3$, i.e. $1.4 = \sqrt{2} < \sqrt{p} < \sqrt{3} = 1.7$.

The maximum local variation of density p is $$\sqrt{\frac{3}{2}} = 1.22$$

for the attenuation, but it is 1.5 (3.5 dB) for the compensation (inverse square of the attenuation).

The curve Ap(Z) obtained then has to be smoothed because differences remain, due to the noise, coupling, and interferences of the direct arrival by the close high reflections, which lead to local variations of the uncorrected amplitude measured on the direct arrival, because only the variations of the low frequencies as a function of the depth of the plane wave attenuation (slow but undeniable tendencies) matter.

At the end of the processing stage, after inversion of the VSP log in preserved amplitude, the impedance pv thus obtained can be used to correct the high-frequency variations with the depth (HF) of the amplitude curves. Furthermore, the all-cause attenuation Ap(Z) due to the primary reflections and to the short-period multiples can be corrected in order to reach the real intrinsic attenuation.

Compensation of the All-cause Plane Wave Attenuation on the Reflected Wavefield It is sufficient to compensate by the vertical 1-D two-way travel below the geophone, after the first arrival on the recorded trace. In accordance with the reciprocity principle, the attenuation undergone is identical for the outward travel and for the return travel, therefore the attenuation multiplying factor is squared for the two-way travel. When reasoning in 1D two-way traveltime, and on the VSP reflections put into vertical two-way time T, it can be seen that the 1D amplitude compensation to be applied after the direct arrival in two-way time $T_0$ is the inverse of the ratio:

$$AN(T, T_0) = \frac{A_p(T)}{A(T_0)} = \frac{A_p^2(t)}{A_p^2(t_0)} \qquad (7)$$

$A_p(t)$ being the wto-way time amplitude from a surface source (or another origin). Knowing that $A_p(T) = A^2_p(t)$ with $$\left(t = \frac{T}{2}\right)$$

one-way time appearing in Equation (6), trace $AN(T,T_0)$ can be readily obtained for each trace of reflection signals, from the sequence of values $A_p(T^i_0)$ after smoothing and of trace $A_p(t)$ sampled in time at the interval of the reflection trace and extrapolated below the well on the basis for example of 4 dB per 1000 m in one-way traveltime, a mean value observed in sedimentary formations by different authors. Trace $AN(T,T^i_0)$ represents the inverse of the gain to be applied after the two-way time $T^i_0$ to compensate the reflection amplitudes for all the possible plane wave attenuation causes for the 1D propagation.

VSP Examples

Attenuation being a phenomenon that is known in the literature for varying with the frequency, measurements were performed in three 30-Hz frequency bands: 10–40 Hz, 40–70 Hz and 70–100 Hz, The compensations have to be carried out in the corresponding bands, when they apply (1D hypothesis). In the present case, a single compensation was applied for all the frequencies, corresponding to the quasi-identical attenuation of the two lower bands 10–40 Hz and 40–70 Hz.

Direct Arrival and Source Repetitiveness

Figure 2:
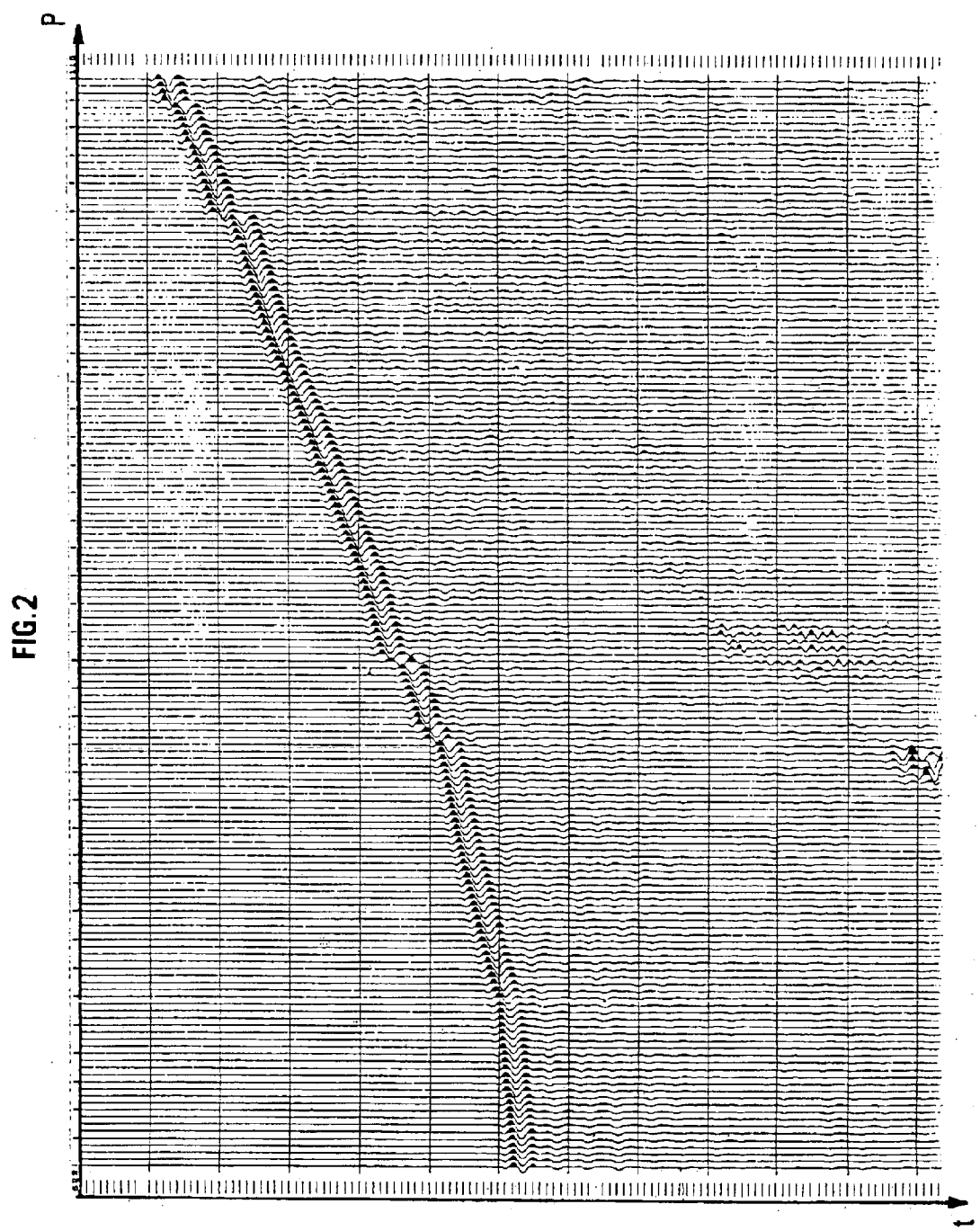
FIG. 2 shows an example of an unprocessed VSP record, vertical component.

The source (a vibrator) was checked regarding repetitiveness concerning the shape and the amplitude of the signal emitted, by means of a surface fixed seismograph. No visible anomaly was detected, whatever the frequency. As a precaution, the VSP seismic traces with high resonances were eliminated from the processing from the beginning; in the present case, the tube wave is not very energetic (FIG. 2 normalized display of the unprocessed VSP), except for the resonances at the level of a bad local cementation of the casing.

Figure 3:
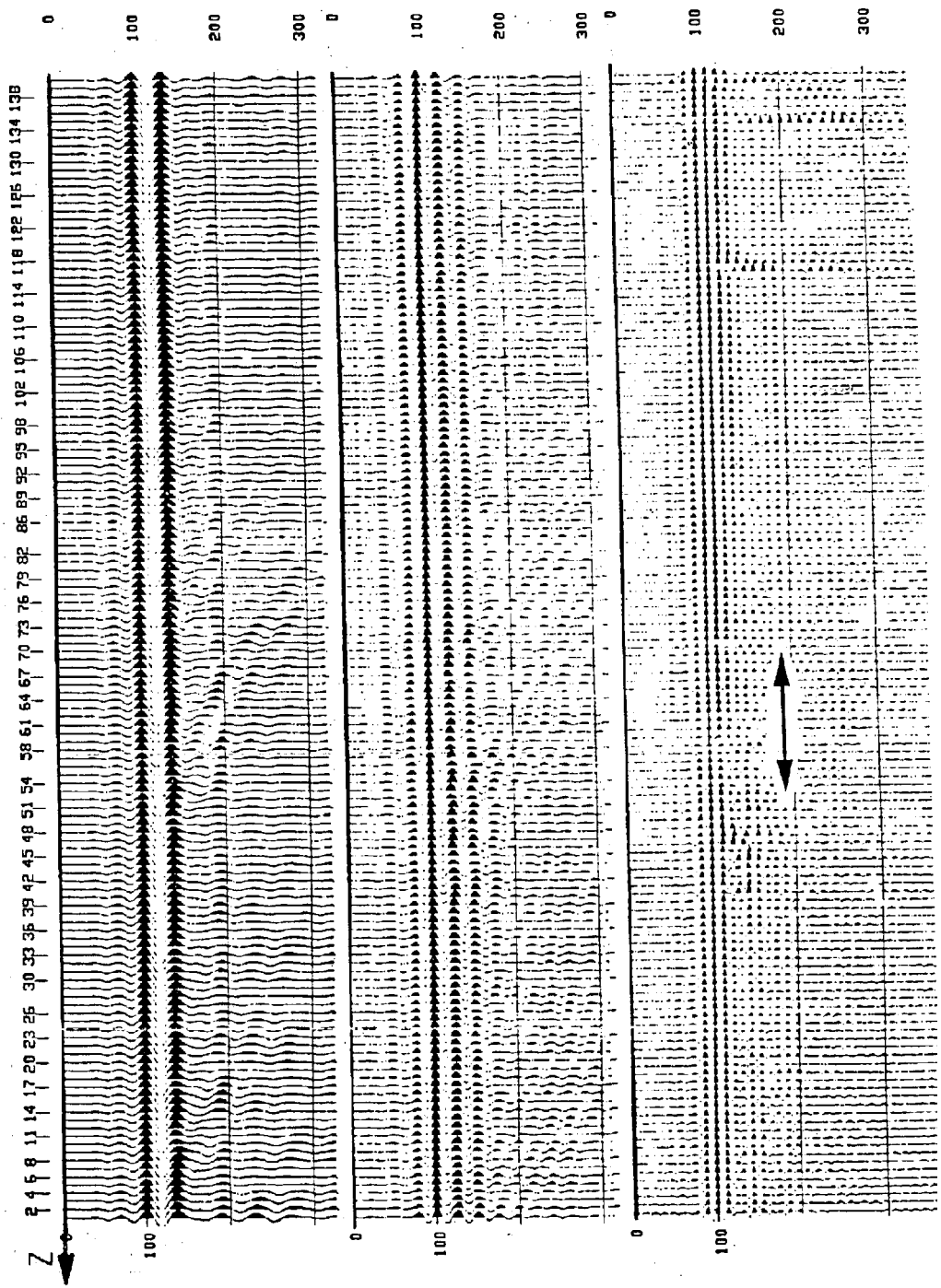
FIG. 3 shows the direct arrivals flattened and normalized in three frequency bands with low-amplitude secondary arrivals (peglegs) between 70 and 100 Hz.

FIG. 3 is a display of the direct arrival flattened by a separate pick in the 3 successive frequency bands, the picks show no measurable bias on the total measuring depth interval of one band in relation to the other (<1 ms between 200 and 2000 m). The consequence for the surface seismic survey is that there is no reason to introduce any time-variable phase shift upon deconvolution. In the 70–100 Hz band, a low-amplitude secondary arrival (referred to as pegleg by specialists) is observed at 140 ms below 1130 m, and a slight increase at 180 ms in the 40–70 Hz band, in the same depth zone. We conclude that the shape anomalies of the downgoing signal depend on the geology and denote the presence of several direct paths connected with heterogeneities at a depth of approximately 1100 m (geologic body of lenticular shape, progradation, etc.).

Processing Results

Figure 8:
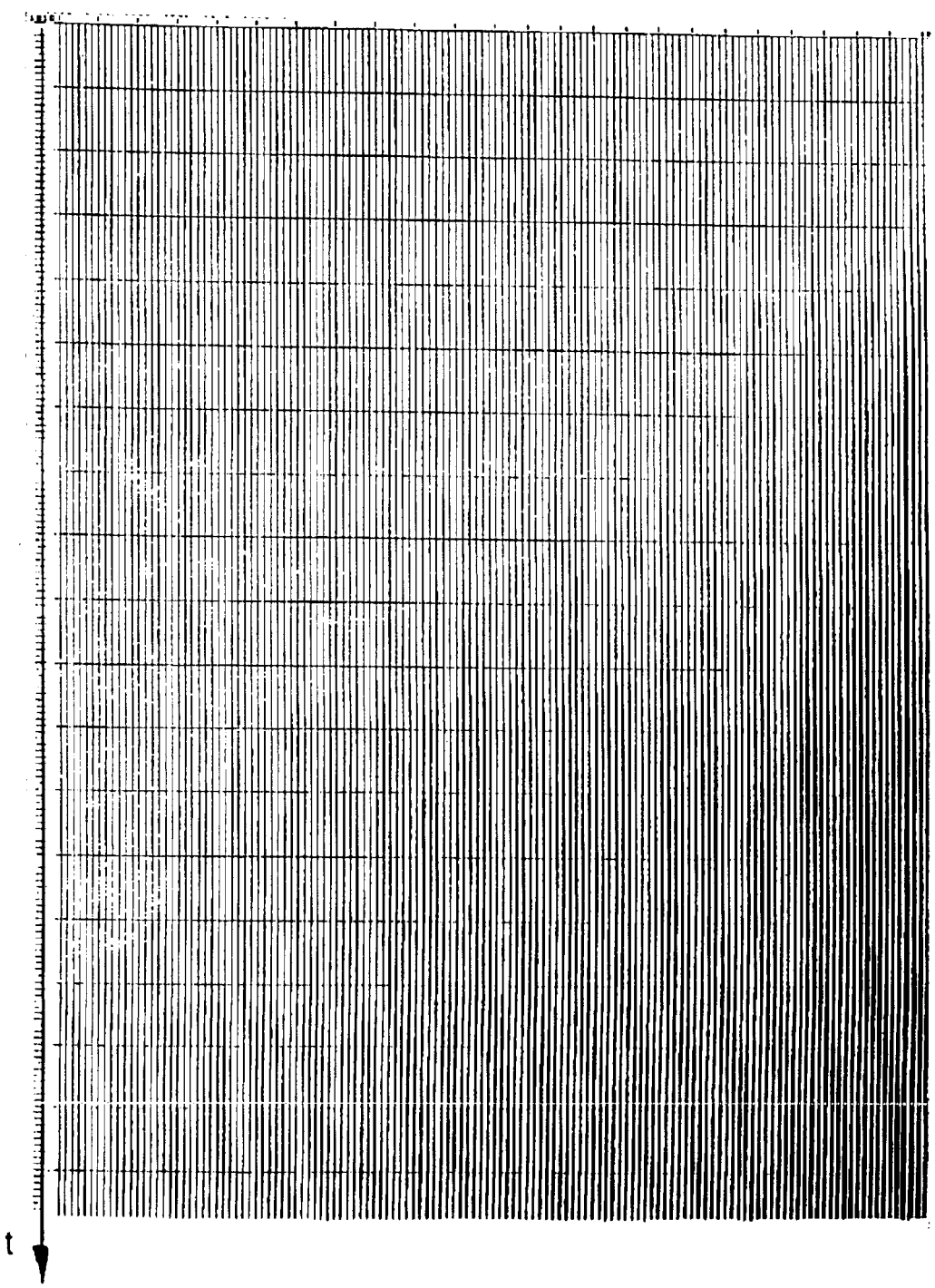
FIG. 8 shows the gain variation curves (gain traces), in dB, used for compensation of the spherical divergence, FIGS. 9a and 9b respectively show a preserved-amplitude VSP log (FIG. 9a) and a log obtained with a sonic type logging tool (FIG. 9b)

The spherical divergence represents the essential part of the spherical wave attenuation, its compensation therefore requires high precision (which is illustrated by the compensation laws of FIG. 8).

Figure 6:
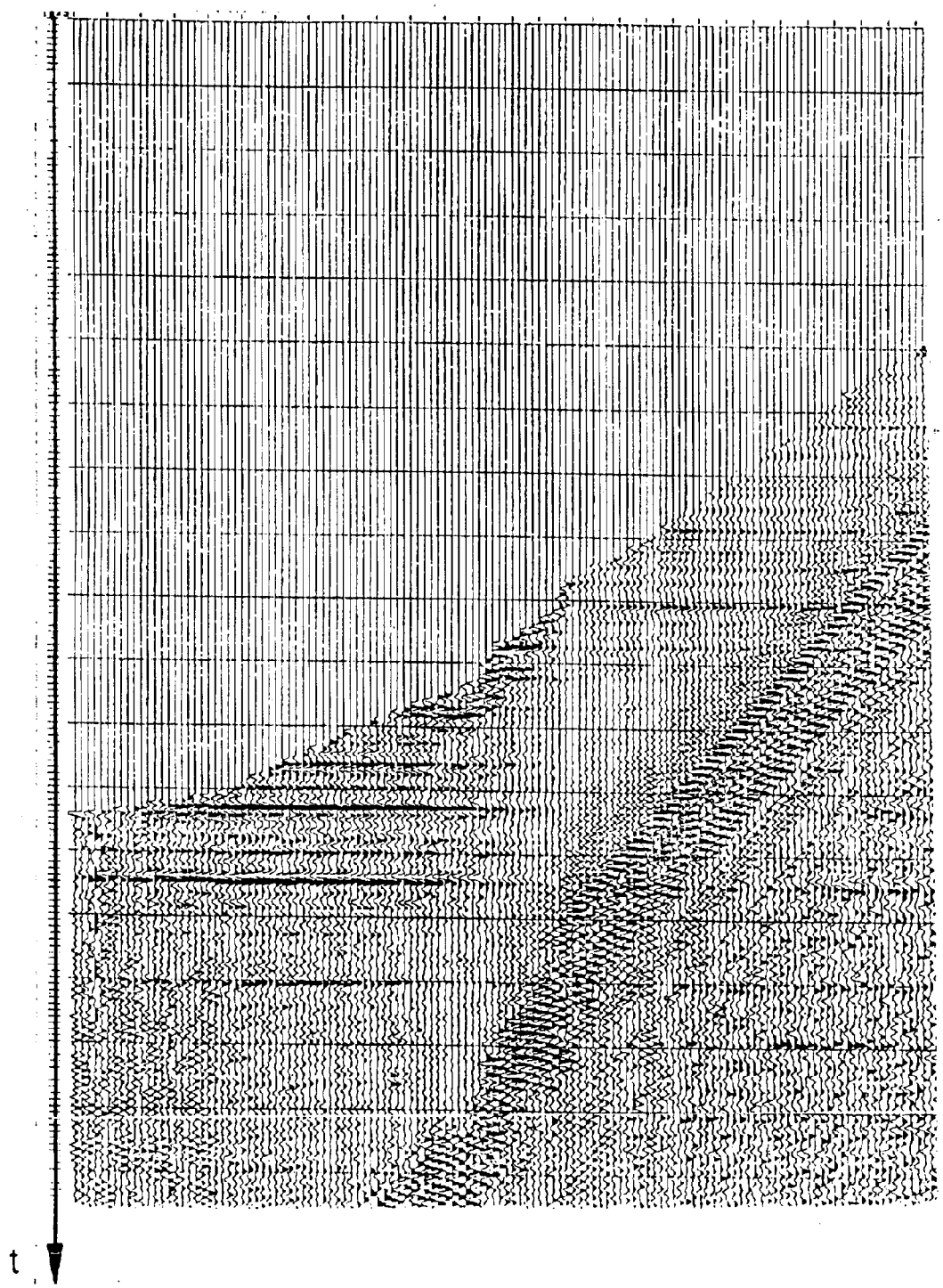
FIG. 6 shows a result of an equalized standard processing without tube wave filtering.
Figure 7A:
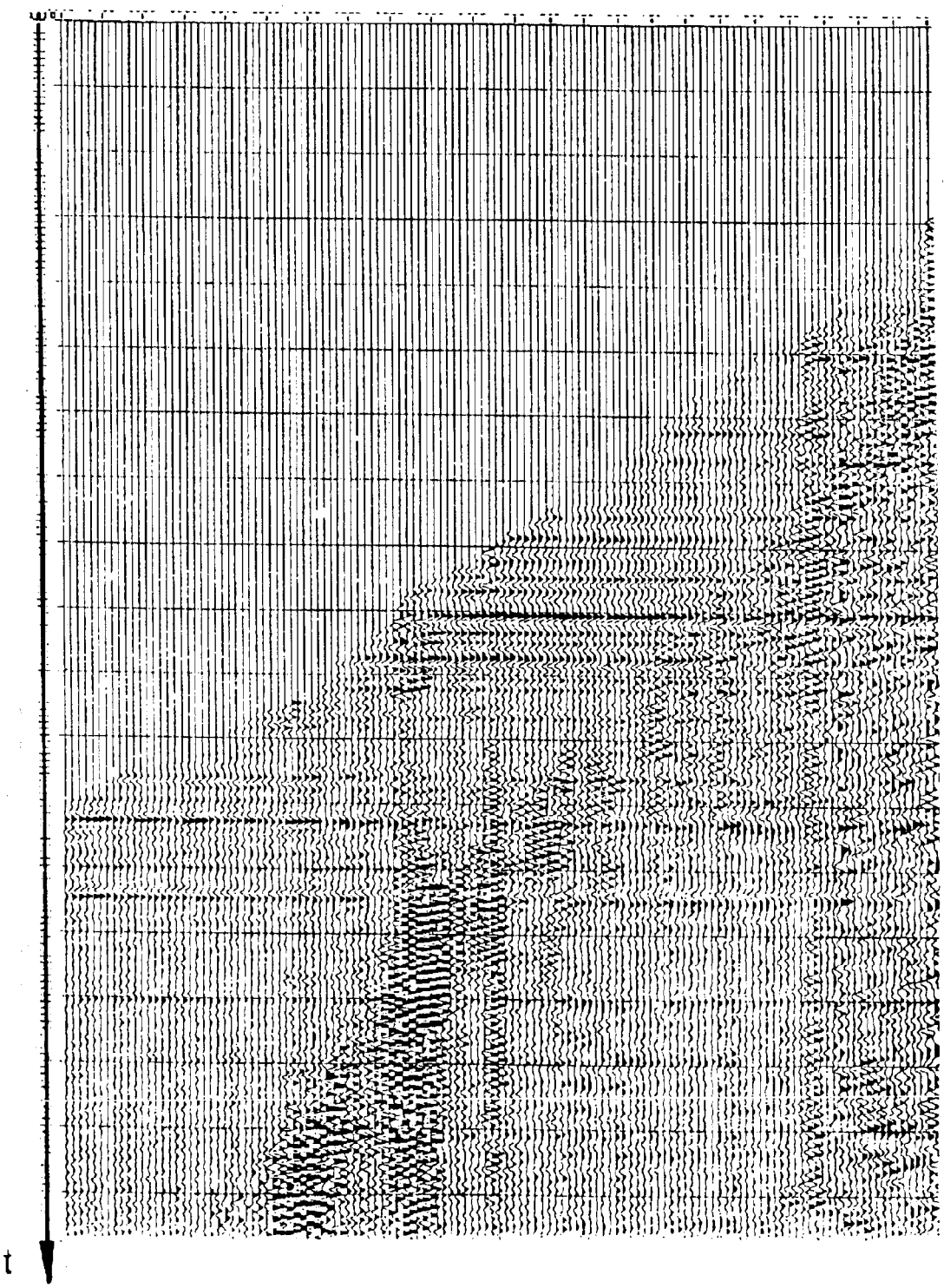
FIG. 7a shows a result of a processing carried out on the normalized direct arrivals, with tube wave filtering and compensation only of the spherical divergence.

The result of the preserved amplitude processing (referred to as PAM processing) of the reflections with tube wave filtering and spherical divergence compensation only is shown (FIG. 7a). It differs from the equalized standard processing result without tube wave rejection (FIG. 6) in that the beginning of the active trace, close to the direct arrival, has too great a relative amplitude on the equalized display, idem for the reflections from 0.5 s below the well bottom. The only positive effect of the equalization is cosmetic by minimization of the tool resonance noise linked with the tube wave. The effects of the time equalization without spectral equalization (FIG. 6) are absolutely not favorable to an amplitude interpretation. When the reflections are compensated for the spherical divergence effect only (FIG. 7a), a good relative amplitude recovery is observed. A frequency analysis shows that it is desirable to apply an additional plane wave attenuation compensation suited to each frequency band. The definition fineness of the gain laws for the recovery of the spherical divergence in FIG. 8 may be underlined.

Figure 7B:
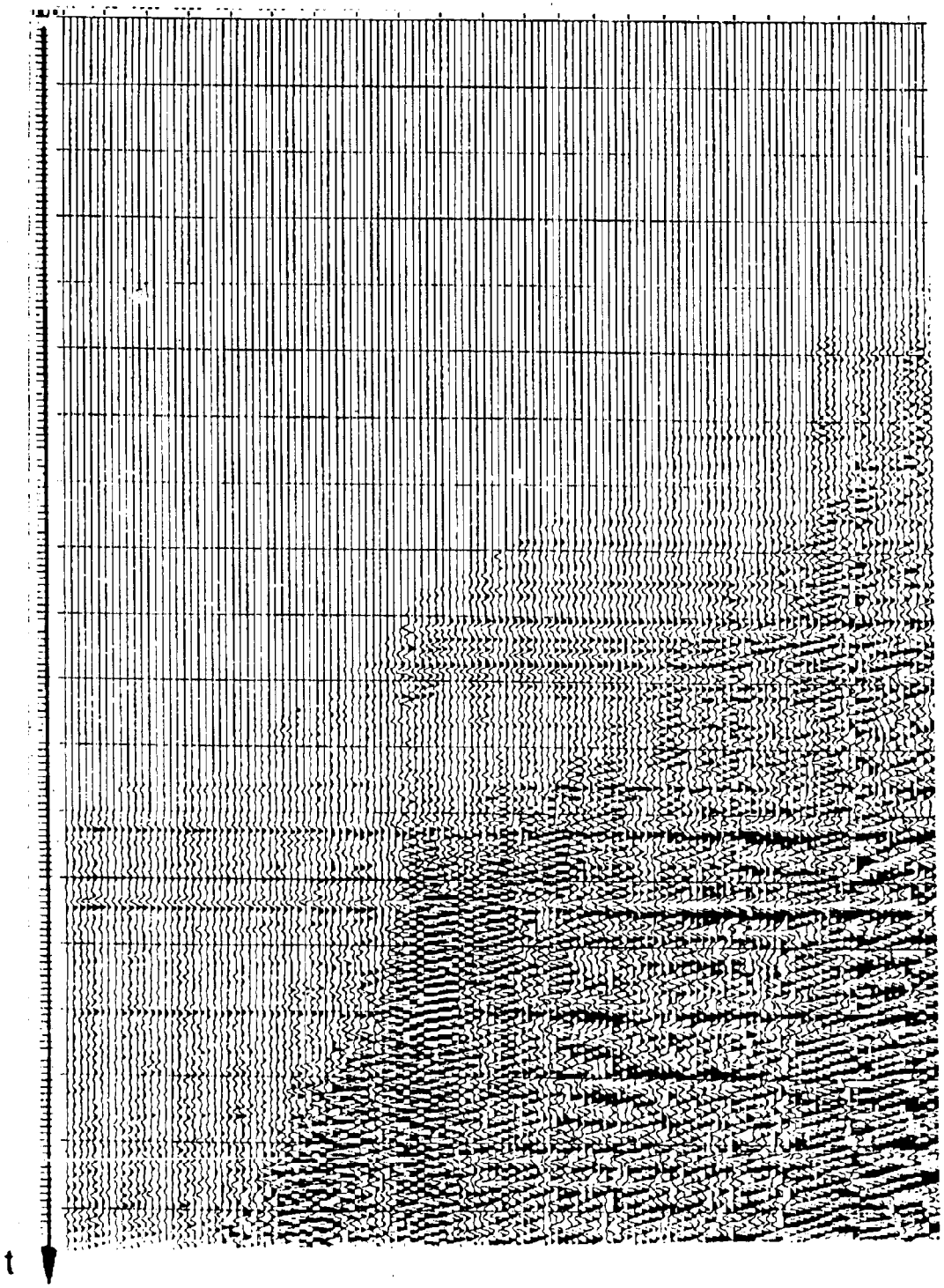
FIG. 7b shows a result similar to the result shown in FIG. 7a after additional compensation of the plane wave attenuation, all the causes being taken into account, in the 10–70 Hz frequency band.

In the present case, the density is assumed to be constant, and FIG. 7b shows the overcompensation effect by the plane wave attenuation, all causes taken into account, measured on first arrival in the 10–70 Hz band. Besides, the compensation gain has been filtered by a low-pass filter at 15 Hz before application, in order to smooth the residual high-frequency (HF) anomalies of the normalized plane wave amplitude attenuation curve APN (FIGS. 4a, 4b and 4c). A distinct overcompensation of the deep reflections (Dogger) between 1.2 s and 1.5 s is observed in the upper part of the well (FIG. 7b), with a sudden increase of the amplitudes above the Portlandian at a depth of approximately 1200 m, a depth above which the attenuation is more marked and where the direct wave is accompanied by a slight signature change HF. The amplitude overcompensation observed shows that the 6 dB attenuation in one-way traveltime at a depth of between 800 m and 1300 m is certainly too high below 70 Hz: the amplitude pick of the Dogger on compensated reflection at about1.2 s–1.35 s (FIG. 7b) between 10–50 Hz shows an overcompensation by a factor 4 (12 dB) between high and low depth points, progressively acquired between 700 m and 1400 m. The fact that the density has been disregarded (factor 1.5 maximum, or b) does not entirely explain this overcompensation. This means that the pressure wave (P) attenuation is overestimated by direct measurement of the direct arrival amplitudes and therefore that part of the energy of the direct arrival is converted to shear weve (S) energy that has not been taken into account in the plane wave attenuation measuring method in pressure mode (P). In practice, the correct compensation of the P wave amplitude attenuation can be estimated at the inverse of $AN(t,t_0)$ and not of $AN(T,T_0)$ which represents the square of $AN(t,t_0)$ according to the definition of Equation (7).

Figure 7C:
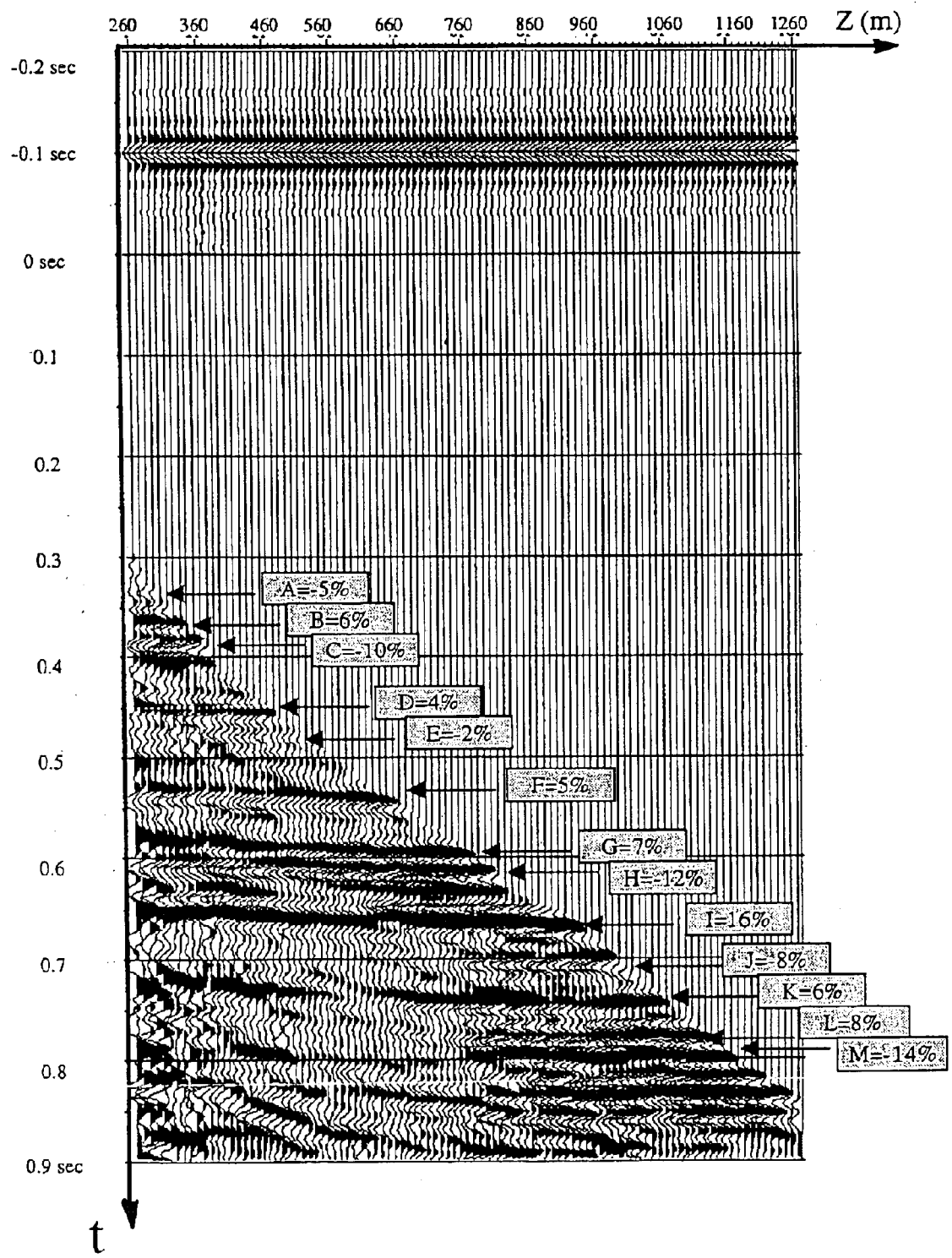
FIG. 7c shows a result similar to the result of FIG. 7a, from another VSP data set.

FIG. 7c shows, at the top of the reflected signals of the VSP, the signature extracted from the downgoing wave, and deconvoluted by itself, and normalized at the absolute amplitude of 10%, in order to visually evaluate the amplitudes of the reflected waves deconvoluted and filtered by the same operator, the reflected waves being normalized in relation to a 100% incident wave. This simultaneous representation of the waves reflected in absolute amplitude with the downgoing wave subjected to the same filtering operations, including wave separation and division by a factor 10, is particularly meaningful to geophysicists.

In an empirical and pragmatic way, it is justified to make a reliable estimation of the plane wave attenuation, all causes taken into account, from the spherical divergence compensated reflection signals by normalization of a great horizontal reflection at a constant equal to the absolute amplitude of this reflection read in the immediate vicinity of the direct arrival.

If the medium is a 1-medium, it is thus possible to compensate for all the attenuation causes, the procedure using frequency bands even allows to disregard the constant Q hypothesis (linear attenuation with the frequency). If the medium is not a 1-D medium, this can be seen by measuring the amplitude of the continuous great reflections after compensation and plausible approximations of the plane wave amplitude compensation can be made, which allow the amplitude of the reflections to be coherent, in the absence of an amplitude variation with offset (AVO) effect.

Figure 7D:
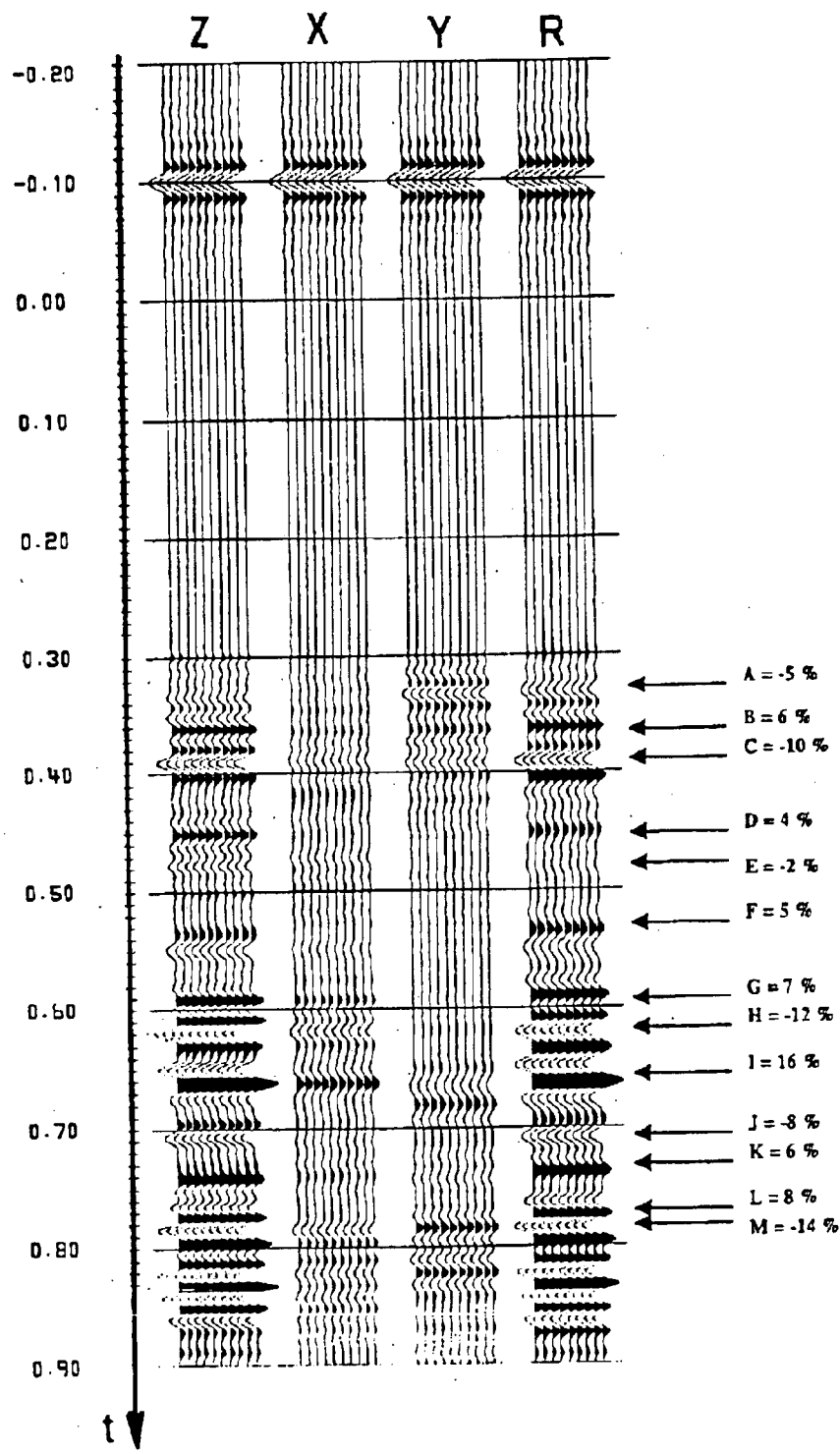
FIG. 7d shows a result similar to the result of FIG. 7c, in absolute amplitude for the VSP log, after isotropic stacking on each of the 3 components in the reflection domain located just below the well pickups.

In order to represent the preserved and absolute amplitude VSP results in a more vivid way, representing the VSP convolution wavelet at the top of the reflected signals (FIGS. 7c, 7d) with an amplitude normalized at 10%, in the same frequency band as the deconvoluted reflection is used, and in the same polarity. This wavelet is obtained after deconvolution of the downgoing wavetrain by itself and division by 10, and application of the sign of a reflection coefficient corresponding to an impedance increase with depth. Besides the increased ease of reading the seismic amplitudes, this assemblage of signals is particularly useful to geophysicists who wish to apply an identical frequency filtering to the wavelet and to the reflected wavefield, because the filter has to be applied to a single composite seismic trace, and careless mistakes have to be avoided during processing. FIG. 7d shows the 3 components Z(vertical), X(horizontal -North) and Y(horizontal -East); component R represents the total resultant of the reflection in the maximum polarization direction for each P-P type reflection.

Inversion

In any case, it is possible to precisely calculate the reflection coefficients in the logged zone of VSP and to compare them coefficients with those obtained by calculation from the logs obtained with a sonic type tool (if possible combined with density measurements), since the compensations applied are minimal for the reflectors located immediately below the geophone (in the domain referred to as corridor stack or VSP log).

Figures 9A, 9B:
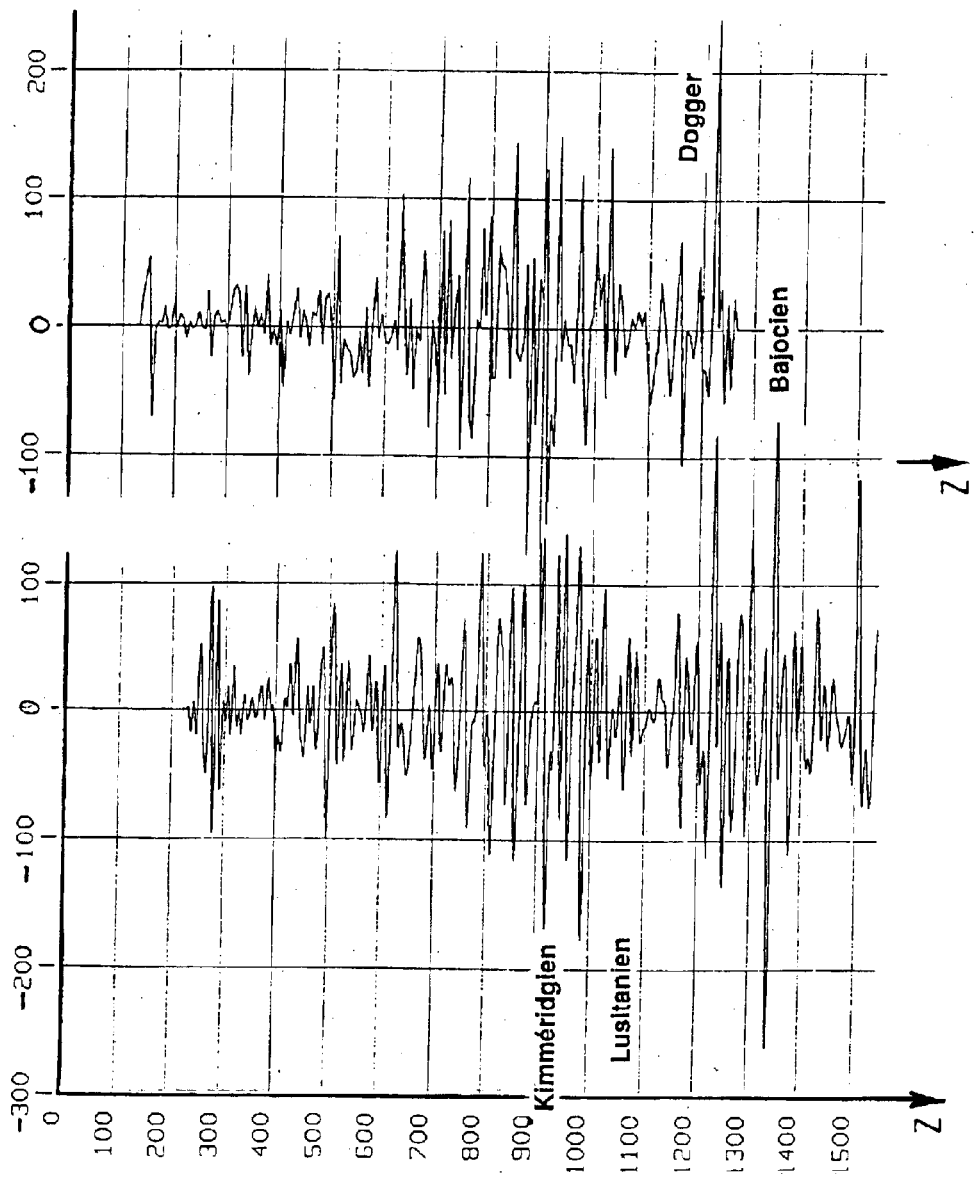

The preserved-amplitude VSP log obtained (FIG. 9a) shows the reflection coefficients in thousandths. It can be seen that most reflection coefficients are below 0.1, except at the Kimmeridgian (−0.17), at the top of the Dogger (+0.23) and at the Bajocian (±0.25). The comparison with the reflections calculated from the sonic tool (FIG. 9b) is qualitatively good for the low-dip monoclinal reflectors, excellent at the Kimmeridgian (920 ms) and Dogger (1220 ms), locally different at the Lusitanian (1070–1100 ms) and Cenomanian to Aptian (500–700 ms). Two factors may be involved to explain the differences: on the one hand, the density may not always vary like the signal produced by the sonic tool (which is not calibrated by the VSP times), and on the other hand the corridor stack domain used to produce the VSP log, which "sees" within a radius of 25 to 50 m around the well, averages the effects due to the presence of heterogeneities in the vicinity of the well and is less sensitive to decimetric heterogeneities and to borehole caving than logs. In this sense, the VSP log gives a more representative 1D model than logs for surface seismic survey calibration.

FIG. 10a shows the impedance inversion of the VSP log in comparison with the data obtained by the sonic tool that is not calibrated on the right, in two-way time scale. Only the addition of the density log to the results of the sonic tool would allow to appraising the reliability of the VSP log in high frequency (HF) for fine quantitative impedance recovery.

Particular Applications of the Preserved-amplitude VSP Processing

Normalization of the VSP direct arrival deconvoluted by itself, followed by precise recovery of the spherical divergence, allows a more critical reading of the deconvoluted reflection display events of abnormally high amplitude, such as certain diffractions for example, appear, which backs up the structural interpretation ensuing therefrom. Operations can also be carried out in three components, by combining the preserved-amplitude processing method with the method described for example in U.S. Pat. No. 6,076,045 filed by the assignee.

The preserved-amplitude processed VSP allows precise quantification of the absolute amplitude reflection coefficients in the frequency band determined by the direct arrival signal recorded by the VSP receiver. The accuracy is estimated at approximately ±7%. By way of example, this allows to spotlight geologic layers that behave like seismic screens, to produce better simulations possibly by modelling, and to make a precise estimation of the amplitude of possible inner multiples that may affect the surface seismic survey results.

The order of magnitude of the attenuations measured and the absence of bias of the direct arrival time picked for various frequencies between 10 and 100 Hz allow maintaining that no noticeable phase variation of the signal transmitted can be observed; deconvolutions therefore must not introduce any in surface seismic surveys.

Multiple Event Identification Example

The preserved-amplitude VSP processed above shows (FIG. 7b) the real amplitude of the primary reflections below the well bottom, in the 1.6s–1.8s range, with the low-frequency tendency multiples mixed with possible S-P downgoing conversions reflected on the Portlandian-Kimmeridgian. The deep primary reflections appear in a non-disturbed way when the geophone is arranged below the Kimmeridgian, at depths greater than 1200 m, which means that it strongly reflects the waves and produces multiples with the surface or the immediate subsurface. A frequency analysis by means of band-pass filters allows this diagnosis to be confirmed.

Another important application of the method is predicting the impedance and the seismic velocity of the formations below the temporary depth of a well during a drilling operation, by inversion of the seismic reflections, in order to carry out the drilling operations to come under safer or more economical conditions. For this application, it can be easily understood that inversion post-processing of the VSP results in acoustic impedance giving better results from a preserved-amplitude VSP processing.

FIG. 11 is a flowchart of a seismic processing method for recovering, within a VSP type seismic prospecting method, of absolute amplitude ratios between, seismic signals corresponding to upgoing waves emitted by a seismic source coupled with a geologic formation and reflected from subsoil discontinuities, the seismic signals being received by separated seismic receivers coupled with a wall of a well through the geologic formation, in a depth zone of the well, and seismic signals corresponding to downgoing ways received by the seismic receivers coming from the seismic source. The process proceeds from starting point 100 to point 102 where normalizing downgoing waves at the seismic receivers of a zero-phase amplitude pulse in a frequency band determined by a signal-to-noise ratio observed in the frequency band occurs which is carried out after deconvolution of a signature of a total field of the downgoing and upgoing waves by the downgoing waves, which compensates for the upgoing waves attenuation in a downgoing wave path between the source and the receiver. The process proceeds from point 102 to point 104 where separation of the upgoing and downgoing waves occurs by multitrace velocity filters including parameters adjusted to observe waves. The process proceeds from point 104 to point 106 where compensating differences between amplitudes received by each seismic receiver occurs, due to spherical divergence between a path of the upgoing waves and a path of the downgoing waves coming from a seismic source occurs. The process proceeds from point 106 to point 108 wherein normalizing downgoing waves at seismic receivers in a form of a zero-phase amplitude pulse occurs between a level of each seismic receiver and a level of each reflecting discontinuity, to normalize an amplitude of reflectors at a value measured by receivers located immediately above the reflectors.

FIG. 12 illustrates a seismic processing method for recovering, within a VSP type seismic prospecting method, of absolute amplitude ratios between, seismic signals corresponding to upgoing waves emitted by a seismic source coupled with a geologic formation and reflected by subsoil discontinuities, the seismic signals being received by seismic receivers coupled with a wall of a well through the geologic formation at selected different positions, in a depth zone of the well, and seismic signals corresponding to downgoing waves received by the seismic receivers coming from the seismic source. The process proceeds from starting point 200 to point 202 where deconvoluting a signature of a total wave field including downgoing and upgoing waves by the downgoing waves which compensates for the reflected waves for all physical attenuation causes concerning a downgoing wave path between the seismic source and the receiver occurs. The process proceeds from point 202 to point 204 where separating upgoing and downgoing waves by multitrace velocity filters with parameters adjusted to observe waves occurs. The process proceeds from point 204 to point 206 wherein normalizing the downgoing waves at the seismic receivers in a form of a zero-phase amplitude pulse in a frequency band determined by a signal-to-noise ratio occurs. The process proceeds from point 206 to point 208 where compensating amplitudes of deconvoluted reflections accounting for a ratio between a spherical divergence on a path of the upgoing waves and a spherical divergence on a path of the downgoing waves at a position of each of the seismic receivers occurs.

Another possible application consists, by means of the recovery of seismic events in preserved amplitude, in reliably discriminating the real nature of the events observed, of reflection with P-P, P-S, S-P, S-S conversion type, diffraction in mode P or in mode S, refraction, corresponding to totally different interpretative schemes as regards the geologic structure in the vicinity of the well.

What is claimed is:

1. A seismic processing method for recovering, within a VSP type seismic prospecting method, of absolute amplitude ratios between, seismic signals corresponding to upgoing waves emitted by a seismic source coupled with a geologic formation and reflected from subsoil discontinuities, the seismic signals being received by separated seismic receivers coupled with a wall of a well through the geologic formation, in a depth zone of the well, and seismic signals corresponding to downgoing waves received by the seismic receivers coming directly from the seismic source, comprising:

normalizing downgoing waves at the seismic receivers of a zero-phase amplitude pulse in a frequency band determined by a signal-to-noise ratio observed in the frequency band, which is carried out after deconvolution of a signature of a total field of the downgoing and upgoing waves by the downgoing waves, which compensates for the upgoing wave attenuation in a downgoing wave path between-the source and the receiver;

separating the upgoing and downgoing waves with multitrace velocity filters including parameters adjusted to observed waves;

compensating differences between amplitudes received by each seismic receiver, due to spherical divergence between a path of the upgoing waves and a path of the downgoing waves coming directly from the seismic source, and wherein the normalizing downgoing waves at seismic receivers in a form of zero-phase amplitude pulse is between a level of each seismic receiver and a level of each reflecting discontinuity, to normalize an amplitude of reflectors at a value measured by receivers located immediately above the reflectors.

2. A method as claimed in claim 1, comprising:
compensating transmission attenuation of a two-way path between a level of each seismic receiver and a level of each reflecting discontinuity, calculated from measured amplitudes of downgoing waves directly arriving at the seismic receivers.

3. A method as claimed in claim 2, wherein:
transmission attenuation compensation is performed selectively by frequency bands.

4. A method as claimed in claim 1, wherein:
a reflector normalization law, which determines attenuation of formations intersected in a depth zone of the well, is selected, to perform the normalizing of down going waves.

5. A method as claimed in claim 4, wherein:
seismic energy lost by wave mode conversion during transmission through reflecting seismic interfaces in the frequency band is determined, by a difference between a two-way plane wave attenuation law used to normalize the amplitude of the reflectors in the depth zone of the well and a square of a one-way plane wave attenuation law measured from downgoing wave arrivals at the seismic receivers in the frequency band.

6. A method as claimed in claim 1, comprising:
performing impedance inversion of a stacked seismic trace of one of a VSP log or a well survey image after preserved-amplitude processing.

7. A method as claimed in claim 2, comprising:
performing impedance inversion of a stacked seismic trace of one of a VSP log or a well survey image after preserved-amplitude processing.

8. A method as claimed in claim 3, comprising:
performing impedance inversion of a stacked seismic trace of one of a VSP log or a well survey image after preserved-amplitude processing.

9. A method as claimed in claim 4, comprising:
performing impedance inversion of a stacked seismic trace of one of a VSP log or a well survey image after preserved-amplitude processing.

10. A method as claimed in claim 5, comprising:
performing impedance inversion of a stacked seismic trace of one of a VSP log or a well survey image after preserved-amplitude processing.

11. A method as claimed in claim 1, wherein:
each seismic receiver comprises three pickups oriented along three different axes; and performing isotropic processing of signals sensed by the three pickups and accounting for a resultant total of downgoing wavetrains during the deconvoluting of a signature and normalization of downgoing wave arrivals.

12. A method as claimed in claim 2, wherein:
each seismic receiver comprises three pickups oriented along three different axes; and performing isotropic processing of signals sensed by the three pickups and accounting for a resultant total of downgoing wavetrains during the deconvoluting of a signature and normalization operations of downgoing wave arrivals.

13. A method as claimed in claim 3, wherein:
each seismic receiver comprises three pickups oriented along three different axes; and performing isotropic processing of signals sensed by the three pickups and accounting for a resultant total of downgoing wavetrains during the deconvoluting of a signature and normalization operations of downgoing wave arrivals.

14. A method as claimed in claim 4, wherein:
each seismic receiver comprises three pickups oriented along three different axes; and performing isotropic processing of signals sensed by the three pickups and accounting for a resultant total of downgoing wavetrains during the deconvoluting of a signature and normalization operations of downgoing wave arrivals.

15. A method as claimed in claim 5, wherein:
each seismic receiver comprises three pickups oriented along three different axes; and performing isotropic processing of signals sensed by the three pickups and accounting for a resultant total of downgoing wavetrains during the deconvoluting of a signature and normalization operations of downgoing wave arrivals.

16. A method as claimed in claim 6, wherein:
each seismic receiver comprises three pickups oriented along three different axes; and performing isotropic processing of signals sensed by the three pickups and accounting for a resultant total of downgoing wavetrains during the deconvoluting of a signature and normalization operations of downgoing wave arrivals.

17. A method as claimed in claim 1, comprising:
preprocessing to compensate for amplitude variations of the waves emitted by the seismic source due to repeating defaults.

18. A method as claimed in claim 2, comprising:
preprocessing to compensate for amplitude variations of the waves emitted by the seismic source due to repeating defaults.
19. A method as claimed in claim 3, comprising:
preprocessing to compensate for amplitude variations of the waves emitted by the seismic source due to repeating defaults.
20. A method as claimed in claim 4, comprising:
preprocessing to compensate for amplitude variations of the waves emitted by the seismic source due to repeating defaults.
21. A method as claimed in claim 5, comprising:
preprocessing to compensate for amplitude variations of the waves emitted by the seismic source due to repeating defaults.
22. A method as claimed in claim 6, comprising:
preprocessing to compensate for amplitude variations of the waves emitted by the seismic source due to repeating defaults.
23. A method as claimed in claim 11, comprising:
preprocessing to compensate for amplitude variations of the waves emitted by the seismic source due to repeating defaults.
24. A method as claimed in claim 1, comprising:
deconvolution of a signature of the seismic source.
25. A method as claimed in claim 2, comprising:
deconvolution of a signature of the seismic source.
26. A method as claimed in claim 3, comprising:
deconvolution of a signature of the seismic source.
27. A method as claimed in claim 4, comprising:
deconvolution of a signature of the seismic source.
28. A method as claimed in claim 5, comprising:
deconvolution of a signature of the seismic source.
29. A method as claimed in claim 6, comprising:
deconvolution of a signature of the seismic source.
30. A method as claimed in claim 11, comprising:
deconvolution of a signature of the seismic source.
31. A method as claimed in claim 17, comprising:
deconvolution of a signature of the seismic source.
32. A method as claimed in claim 1, comprising:
processing to recover seismic events reflected in one of P-S, S-P type converted mode, or S-S mode.
33. A method as claimed in claim 2, comprising:
processing to recover seismic events reflected in one of P-S, S-P type converted mode, or S-S mode.
34. A method as claimed in claim 3, comprising:
processing to recover seismic events reflected in one of P-S, S-P type converted mode, or S-S mode.
35. A method as claimed in claim 4, comprising:
processing to recover seismic events reflected in one of P-S, S-P type converted mode, or S-S mode.
36. A method as claimed in claim 5, comprising:
processing to recover seismic events reflected in one of P-S, S-P type converted mode, or S-S mode.
37. A method as claimed in claim 6, comprising:
processing to recover seismic events reflected in one of P-S, S-P type converted mode, or S-S mode.
38. A method as claimed in claim 11, comprising:
processing to recover seismic events reflected in one of P-S, S-P type converted mode, or S-S mode.
39. A method as claimed in claim 17, comprising:
processing to recover seismic events reflected in one of P-S, S-P type converted mode, or S-S mode.
40. A method as claimed in claim 24, comprising:
processing to recover seismic events reflected in one of P-S, S-P type converted mode, or S-S mode.
41. A seismic processing method for recovering, within a VSP type seismic prospecting method, of absolute amplitude ratios between, seismic signals corresponding to upgoing waves emitted by a seismic source coupled with a geologic formation and reflected by subsoil discontinuities, the seismic signals being received by seismic receivers coupled with a wall of a well through the geologic formation at selected different positions, in a depth zone of the well, and seismic signals corresponding to downgoing waves received by the seismic receivers coming directly from the seismic source, comprising:
   deconvoluting a signature of a total wave field including downgoing and upgoing waves by the downgoing waves which compensates for the reflected waves for all physical attenuation causes concerning a downgoing wave path between the seismic source and the receivers;
   separating upgoing and downgoing waves by multitrace velocity filters with parameters adjusted to observed waves;
   normalizing the downgoing waves at the seismic receivers in a form of a zero-phase amplitude pulse in a frequency band determined by a signal-to-noise ratio; and
   compensating amplitudes of deconvoluted reflections accounting for a ratio between a spherical divergence on a path of the upgoing waves and a spherical divergence on a path of the downgoing waves at a position of each of the seismic receivers.
42. A method as claimed in claim 41, comprising:
compensating for transmission attenuation of a two-way path between a position of each seismic receiver and a position of each reflecting discontinuity, calculated from measured amplitudes of downgoing wave arrivals at the seismic receivers.
43. A method as claimed in claim 42, wherein:
compensating for transmission attenuation is performed selectively by frequency band.
44. A method as claimed in claim 41, comprising:
compensating for transmission attenuation of a two-way path between a position of each seismic receiver and a position of each reflecting discontinuity, so as to normalize an amplitude of reflectors at a value measured by receivers located immediately above the reflectors.
45. A method as claimed in claim 41, wherein:
a reflector normalization law, which determines attenuation of formations intersected in a depth zone, is selected to perform the normalizing of down going waves.
46. A method as claimed in claim 45, wherein:
seismic energy lost by wave mode conversion during transmission through reflecting seismic interfaces in the frequency band is determined, by a difference between a two-way plane wave attenuation law used to normalize a amplitude of reflectors in a depth zone of the well and a square of the ones way plane wave attenuation law measured from downgoing waves at the seismic receivers and in the frequency band.

* * * * *